(12) United States Patent
Akhter et al.

(10) Patent No.: US 10,135,955 B2
(45) Date of Patent: Nov. 20, 2018

(54) METHODS AND APPARATUSES FOR A UNIFIED COMPRESSION FRAMEWORK OF BASEBAND SIGNALS

(71) Applicant: Integrated Device Technology, Inc., San Jose, CA (US)

(72) Inventors: Mohammad Shahanshah Akhter, Ottawa (CA); Bachir Berkane, Ottawa (CA)

(73) Assignee: Integrated Device Technology, Inc., San Jose, CA (US)

( * ) Notice: Subject to any disclaimer, the term of this patent is extended or adjusted under 35 U.S.C. 154(b) by 181 days.

(21) Appl. No.: 15/054,043

(22) Filed: Feb. 25, 2016

(65) Prior Publication Data

US 2016/0182690 A1 Jun. 23, 2016

Related U.S. Application Data

(62) Division of application No. 14/134,998, filed on Dec. 19, 2013, now Pat. No. 9,313,300.

(Continued)

(51) Int. Cl.
  *H04J 3/24* (2006.01)
  *H04L 29/06* (2006.01)
  *H04W 88/08* (2009.01)

(52) U.S. Cl.
  CPC .......... *H04L 69/08* (2013.01); *H04L 29/06* (2013.01); *H04L 69/04* (2013.01); *H04L 69/22* (2013.01); *H04W 88/085* (2013.01)

(58) Field of Classification Search
  CPC ......... H04L 69/08; H04L 29/06; H04L 69/04; H04L 69/22; H04W 88/085

(Continued)

(56) References Cited

U.S. PATENT DOCUMENTS 5,999,561 A 12/1999 Naden et al.
6,115,341 A * 9/2000 Hirai .................... H04N 9/8042
                                                                                          369/59.13

(Continued)

FOREIGN PATENT DOCUMENTS

KR       1020080056360 A       6/2008
WO          2005048625 A1       5/2005

(Continued)

OTHER PUBLICATIONS

CPRI Specification V4.1, Common Public Radio Interface (CPRI); Interface Specification, Feb. 1, 2009, 75 pages.

(Continued)

*Primary Examiner* — Sai Ming Chan
(74) *Attorney, Agent, or Firm* — Glass & Associates; Kenneth Glass

(57) ABSTRACT

A method and apparatus provides a parameter estimation processor configured to estimate parameters used to compress data for transmission over a serial data link. The parameter estimation processor includes a processor. The processor includes user programmable inputs. The user programmable inputs set an input data packet length, a target compression ratio, and a resampling factor and allow filter parameters to be set. Input data information is received from an input data buffer of a data sample compressor. The processor performs a function that: (a) adjusting a target compression ratio by a first compression ratio to determine a remaining compression ratio when the resampling operation is enabled; (b) estimating a set of compression parameters that are used to achieve the remaining compression ratio, the set of compression parameters includes an attenuation value, filter order, a type of encoding; and (c) sends the set of compression parameters to the data sample compressor. The data sample compressor applies the compression (Continued)

parameters to a packet of input data and outputs a plurality of compressed data words.

10 Claims, 19 Drawing Sheets

Related U.S. Application Data

(60) Provisional application No. 61/901,278, filed on Nov. 7, 2013.

(58) Field of Classification Search
USPC .......................................................... 370/474
See application file for complete search history.

(56) References Cited

U.S. PATENT DOCUMENTS

| | | |
|---|---|---|
| 6,192,259 B1 | 2/2001 | Hayashi |
| 6,226,325 B1 | 5/2001 | Nakamura |
| 6,240,084 B1 | 5/2001 | Oran et al. |
| 6,263,503 B1 | 7/2001 | Margulis |
| 6,449,596 B1 | 9/2002 | Ejima |
| 6,728,778 B1 | 4/2004 | Brennan et al. |
| 6,775,530 B2 | 8/2004 | Severson et al. |
| 6,842,623 B2 | 1/2005 | Koscal |
| 6,903,668 B1 | 6/2005 | Dror et al. |
| 7,009,533 B1 | 3/2006 | Wegener |
| 7,088,276 B1 | 8/2006 | Wegener |
| 7,142,519 B2 | 11/2006 | Saadeh et al. |
| 7,519,383 B2 | 4/2009 | Olgaard |
| 7,529,215 B2 | 5/2009 | Osterling |
| 7,541,950 B2 | 6/2009 | Wegener |
| 7,564,861 B1 | 7/2009 | Subbiah |
| 7,599,283 B1 | 10/2009 | Varier et al. |
| 7,623,894 B2 | 11/2009 | Vaglica et al. |
| 7,656,897 B2 | 2/2010 | Liu |
| 7,680,149 B2 | 3/2010 | Liu et al. |
| 7,706,477 B2 | 4/2010 | Larsson |
| 7,835,435 B2 | 11/2010 | Soni et al. |
| 7,852,797 B2 | 12/2010 | Kang et al. |
| 7,899,410 B2 | 3/2011 | Rakshani et al. |
| 7,924,929 B2 | 4/2011 | Meenakshisundaram et al. |
| 7,930,436 B1 | 4/2011 | Znosko |
| 7,961,807 B2 | 6/2011 | Kotecha et al. |
| 8,005,152 B2 | 8/2011 | Wegener |
| 8,018,910 B2 | 9/2011 | Jiang et al. |
| 8,054,889 B2 | 11/2011 | Isu et al. |
| 8,089,854 B2 | 1/2012 | Persico |
| 8,108,910 B2 | 1/2012 | Conner et al. |
| 8,165,100 B2 | 4/2012 | Sabat et al. |
| 8,174,428 B2 | 5/2012 | Wegener |
| 8,176,524 B2 | 5/2012 | Singh et al. |
| 8,239,912 B2 | 8/2012 | Deng |
| 8,320,433 B2 | 11/2012 | Wegener et al. |
| 8,331,461 B2 | 12/2012 | Wegener et al. |
| 8,340,021 B2 | 12/2012 | O'Keeffe et al. |
| 8,649,388 B2 | 2/2014 | Wegener et al. |
| 8,705,634 B2 | 4/2014 | Wegener |
| 8,825,900 B1 | 9/2014 | Gross, IV et al. |
| 8,989,088 B2 | 3/2015 | Ling |
| 9,026,752 B1 | 5/2015 | Botelho |
| 9,047,669 B1 | 6/2015 | Jean et al. |
| 9,055,472 B2 | 6/2015 | Evans et al. |
| 9,059,778 B2 | 6/2015 | Ling |
| 9,203,933 B1 | 12/2015 | Akhter et al. |
| 9,215,296 B1 | 12/2015 | Akhter et al. |
| 9,240,803 B2 | 1/2016 | Wegener |
| 2002/0055371 A1 | 5/2002 | Arnon et al. |
| 2002/0136296 A1 | 9/2002 | Stone et al. |
| 2002/0163965 A1 | 11/2002 | Lee et al. |
| 2003/0100286 A1 | 5/2003 | Severson et al. |
| 2003/0215105 A1 | 11/2003 | Sacha |
| 2004/0004943 A1 | 1/2004 | Kim et al. |
| 2004/0062392 A1 | 4/2004 | Morton |
| 2004/0082365 A1 | 4/2004 | Sabach et al. |
| 2004/0198237 A1 | 10/2004 | Abutaleb et al. |
| 2004/0218826 A1 | 11/2004 | Terao |
| 2005/0104753 A1 | 5/2005 | Dror et al. |
| 2005/0105552 A1 | 5/2005 | Osterling |
| 2005/0134907 A1 | 6/2005 | Obuchi et al. |
| 2005/0169411 A1 | 8/2005 | Kroeger |
| 2006/0159070 A1 | 7/2006 | Deng |
| 2006/0233446 A1 | 10/2006 | Saito et al. |
| 2007/0054621 A1 | 3/2007 | Larsson |
| 2007/0070919 A1 | 3/2007 | Tanaka et al. |
| 2007/0076783 A1 | 4/2007 | Dishman et al. |
| 2007/0116046 A1 | 5/2007 | Liu et al. |
| 2007/0149135 A1 | 6/2007 | Larsson et al. |
| 2007/0160012 A1 | 7/2007 | Liu |
| 2007/0171866 A1 | 7/2007 | Merz et al. |
| 2007/0293180 A1 | 12/2007 | Rahman et al. |
| 2008/0018502 A1 | 1/2008 | Wegener |
| 2008/0022026 A1 | 1/2008 | Yang et al. |
| 2008/0025298 A1 | 1/2008 | Lev-Ran et al. |
| 2008/0267217 A1 | 10/2008 | Colville et al. |
| 2009/0092117 A1 | 4/2009 | Jiang et al. |
| 2009/0149221 A1 | 6/2009 | Liu et al. |
| 2009/0265744 A1 | 10/2009 | Singh et al. |
| 2009/0290632 A1 | 11/2009 | Wegener |
| 2010/0067366 A1 | 3/2010 | Nicoli |
| 2010/0177690 A1 | 7/2010 | O'Keeffe et al. |
| 2010/0202311 A1 | 8/2010 | Lunttila et al. |
| 2010/0246642 A1 | 9/2010 | Walton et al. |
| 2010/0285756 A1 | 11/2010 | Nakazawa |
| 2011/0235500 A1 | 9/2011 | Shenoi et al. |
| 2011/0280209 A1 | 11/2011 | Wegener |
| 2012/0005752 A1 | 1/2012 | Sprowls et al. |
| 2012/0008696 A1 | 1/2012 | Wegener |
| 2012/0014421 A1 | 1/2012 | Wegener |
| 2012/0014422 A1 | 1/2012 | Wegener |
| 2012/0057572 A1 | 3/2012 | Evans et al. |
| 2012/0183023 A1 | 7/2012 | Filipovic et al. |
| 2012/0202507 A1 | 8/2012 | Zhang et al. |
| 2012/0207206 A1 | 8/2012 | Samardzija et al. |
| 2012/0250740 A1 | 10/2012 | Ling |
| 2012/0307842 A1 | 12/2012 | Petrov et al. |
| 2012/0327956 A1 | 12/2012 | Vasudevan |
| 2012/0328121 A1 | 12/2012 | Truman et al. |
| 2014/0208069 A1 | 7/2014 | Wegener |
| 2015/0003539 A1 | 1/2015 | Umezaki et al. |
| 2015/0092881 A1 | 4/2015 | Hwang et al. |
| 2016/0309363 A1* | 10/2016 | Persson .................. H04L 69/04 |

FOREIGN PATENT DOCUMENTS

| | | |
|---|---|---|
| WO | 2005062494 A1 | 7/2005 |
| WO | 2008152455 A1 | 12/2008 |
| WO | 2009143176 A2 | 11/2009 |
| WO | 2009/151893 | 12/2009 |
| WO | 2011/135013 | 11/2011 |

OTHER PUBLICATIONS

K. I. Pendersen. "Frequency Domain Scheduling for OFDMA with Limited and Noisy Channel Feedback" 2007 IEEE 66th Vehicular Technology Conference. pp. 1792-1796, Oct. 3, 2007., see section II. C.

Maruyama, S. et al., "Base Transceiver Station for W-CDMA System," Fujitsu Sci. Tech. J. 38,2, p. 167-73 Dec. 2002.

OBSAI Open Base Station Architecture Initiative BTS System Reference document Ver. 2.0, Apr. 27, 2006, 151 pages.

OBSAI Open Base Station Architecture Initiative Reference Point 3 Specification Ver. 4.0, Mar. 7, 2007, 119 pages.

"CPRI Specification V3.0 Common Public Radio Interface (CPRI)", Interface Specification. Ericsson Ab, huawei Technologies Col ltd, NEC Corporation, Nortel Networks SA and Siemens Networks BmbH & Co., Oct. 2, 2006, 89 Pages.

* cited by examiner

METHODS AND APPARATUSES FOR A UNIFIED COMPRESSION FRAMEWORK OF BASEBAND SIGNALS

ART BACKGROUND

Transceiver systems in wireless communication networks perform the control functions for directing signals among communicating subscribers, or terminals, as well as communication with external networks. The general operations of a radio transceiver system include receiving radio frequency (RF) signals, converting them to signal data, performing various control and signal processing operations on the signal data, converting the signal data to an RF signal and transmitting the RF signal to the wireless subscriber. Transceiver systems in wireless communications networks include radio base stations and distributed antenna systems (DAS). For the reverse link, or uplink, a terminal transmits the RF signal received by the transceiver system. For the forward link, or downlink, the transceiver system transmits the RF signal to a subscriber, or terminal, in the wireless network. A terminal may be fixed or mobile wireless user equipment unit (UE) and may be a wireless device, cellular phone, personal digital assistant (PDA), personal computer or other device equipped with a wireless modem.

Transceiver systems in wireless communication networks must manage the increasing amounts of data required for offering new services to an expanding subscriber base. System design challenges include ensuring flexibility for evolving standards, supporting growing data processing requirements and reducing overall cost. The modular design approach for radio base stations and distributed antenna systems provides the flexibility to meet these challenges. The components of modular designs include base station processors, or radio equipment controllers (RECs) and radio frequency (RF) units, or radio equipment (RE), coupled by serial data links, using copper wire or fiber optic cabling. The REs include transmitters, receivers, analog to digital converters (ADCs) and digital to analog converter (DACs). Wire or fiber optic serial data links transfer the sampled signals between the REs and the REC of the radio base station system. The sampled signals may be centered at the RF or converted to an intermediate frequency (IF) or baseband prior to transfer over the data link. The REC includes functions for signal processing, control and communication with external networks.

In a typical wireless communication network, wireless user equipment units (UEs) communicate via a radio access network (RAN) to one or more core networks. The RAN covers a geographical area which is divided into cell areas, with each cell area being served by a radio base station. A cell is a geographical area where radio coverage is provided by the radio equipment (RE) at a base station site. Each cell is identified by a unique identity, which is broadcast in the cell. The RE communicates over the air interface with the UEs within range of the base station. In the radio access network, several base stations are typically connected (e.g., by landlines or microwave) to a control node known as a base station controller (BSC) or radio network controller (RNC). The control node supervises and coordinates various activities of the plural radio base stations connected to it. The RNCs are typically connected to one or more core networks. One example of a radio access network is the Universal Mobile Telecommunications (UMTS) Terrestrial Radio Access Network (UTRAN). The UTRAN radio access network uses wideband code division multiple access (WCDMA) for communication with the UEs.

The modular design approach for radio transceiver systems has led the industry to develop interface standards. One example of an internal interface of a transceiver system which links the radio equipment to a radio equipment control controller is the Common Public Radio Interface (CPRI). The Common Public Radio Interface Specification Version 4.1 (Feb. 18, 2009) and previous versions, referred to herein as "CPRI specification," define a publicly available specification for the data transfer interfaces between the radio equipment (RE) and radio equipment controllers (REC) of transceiver systems, including base stations and distributed antenna systems (DAS). The radio equipment control (REC) processes baseband signal data and communicates with the RNC via an interface referred to as "Iub" for UMTS. The radio equipment (RE) performs the RF processing for transmission of signals over the antenna to UEs, referred to as "Uu" for the UMTS air interface. The REC and RE correspond to the base station processor and the RF unit, respectively. The CPRI specification defines protocols for the serial interface and operations at the physical layer (Layer 1) and the data link layer (Layer 2). Layer 1 and Layer 2 are two of seven categories in the hierarchy of communications functions defined for the "Open System Interconnection (OSI)" network architecture developed by the International Organization for Standardization (ISO), referred to as the ISO-OSI network architecture. The serial data link between REC and RE or between two REs, is a bidirectional interface with one transmission line per direction. Connection topologies between the REC and one or more REs include point-to-point, multiple point-to-point, chain, star, tree, ring and combinations thereof.

The CPRI specification supports cellular radio standards 3GPP UTRA FDD, Release 8 (December 2008) and 3GPP E-UTRA, Release 8 (December 2008). The CPRI specification also supports the wireless networking protocol Worldwide Interoperability for Microwave Access, known as WiMax (IEEE 802.16-2004 and IEEE 802.16e-2005). For WiMax, the REC provides access to network entities, such as other WiMax base stations or a WiMax Access Service Network Gateway (ASN-GW). The RE provides the air interface to the subscriber station or mobile subscriber station.

Another example of an interface specification for modular architecture of radio transceiver systems is the Open Base Station Architecture Initiative (OBSAI). The OBSAI specification describes alternative protocols for the interconnection of RF modules, analogous to RE of the CPRI specification, and baseband modules, analogous to REC of the CPRI specification, as well as data transfer protocols for the serial data links. The OBSAI standard supports several wireless modulation formats, including GSM/EDGE, WCDMA, CDMA and WiMax. The OBSAI standard can also accommodate other wireless network configurations or signal modulation formats by incorporating general purpose modules. The OBSAI standard is described in the documents, "OBSAI Open Base Station Architecture Initiative BTS System Reference Document," Version 2.0, 2006, and "OBSAI Open Base Station Architecture Initiative Reference Point 3 Specification," Version 4.0, 2007.

The OBSAI standard describes architectures and protocols for communication between base station processors, referred to as baseband modules, and RF modules. Connection topologies for one or more baseband modules and one or more RF modules include mesh, centralized combiner/distributor and bridge modules. The OBSAI compliant serial data link connecting the baseband module and the RF module is referred to as the reference point 3 (RP3) interface. In systems where remote RF units (RRUs) are connected to a baseband module, the serial data link is referred to as the RP3-01 interface. Connection topologies for the baseband module and RRUs include point-to-point, chain, ring and tree-and-branch. The baseband module/RRUs configurations support distributed antenna systems.

Both the CPRI and the OBSAI architectures apply time-division multiplexing to baseband signal data for transmission over a serial data link. Proprietary or other modular designs for radio base transceiver systems may not comply with CPRI or OBSAI standards.

A distributed antenna system (DAS) distributes signal data from a main antenna or radio data resource to multiple remote antennas connected via Cat5 cable, coaxial cable or fiber optic links. A DAS can connect to a variety of wireless services and then rebroadcast those signals throughout the areas in which the DAS is installed. For example, a DAS can improve cellular telephone coverage within a large building or other structure. A main transceiver and antenna positioned on the roof of the building is connected by cable or fiber to multiple distributed antennas within the building. A DAS may include a "head end" into which source signals are combined for distribution to remote radio units. A DAS system may provide coverage in confined spaces, such as high rise buildings, tunnels, railways and airports. As defined by the DAS Forum of the Personal Communications Industry Association (PCIA), a DAS is a network of spatially separated antenna nodes connected to a common source via a transport medium that provides wireless communication service within a geographic area or structure. The DAS antenna elevations are generally at or below the clutter level and node installations are compact. A digital serial data link may connect the head end to the remote radio units, or heads.

As used herein, "base transceiver system" (BTS) refers to the base station processor(s) and the RF units(s) in communication with and under the control of the base station processor, including any type or length of data transfer link. This includes the conventional base station having RF units collocated with the base station processor or on an antenna tower near the antenna. A DAS is another example of a BTS, although the RF units may be located remotely from the base station processor.

Base transceiver systems for wireless communication networks transfer large amounts of sampled signal data over the serial data links between the base station processor and the RF modules. The need to comply with evolving wireless communication standards, increase data volume and serve more subscribers, may require expensive hardware upgrades to transceiver systems, including increasing the number or capacity of serial data links and increasing the data processing capability of supporting subsystems. These requirements can conflict with constraints on transceiver systems, including physical size limitations, power consumption limitations, geographic restrictions, data sample compression limitations due to signal degradation.

Accordingly, there is a need for increasing the capacity of serial data links and conserving the resources of base transceiver systems for base stations and distributed antenna systems. Compression of data prior to transfer over the serial data links enables the provider to meet these needs by increasing the capacity of existing data links, possibly eliminating or at least postponing, the need to upgrade the existing data links. Increasing the capacity of the data links lowers the cost of data transfer in base transceiver systems. There is also a need for providing compressed signal samples and formatting the compressed samples for compatibility with the data transfer protocols of the BTS, such as CPRI, OBSAI or other data transfer protocols.

SUMMARY OF THE INVENTION

In various embodiments, a method to control compression of data by a parameter estimation processor for transmission over a serial data link includes adjusting a target compression ratio by a first compression ratio to determine a remaining compression ratio. The first compression ratio was performed by a resampling operation. A set of compression parameters is estimated that are used to achieve the remaining compression ratio. The set of compression parameters includes an attenuation value, filter order, a type of encoding. The set of compression parameters is sent to a data sample compressor, the data sample compressor applies the compression parameters to a packet of input data and outputs a plurality of compressed data words. In one embodiment, user programmable inputs include; input data packet length, compression ratio target, and resampling factors. In one embodiment, the resampling operation is bypassed. In one embodiment, the redundancy removal is bypassed when filter order is set to zero.

In one embodiment, the estimating divides an input data packet into N segments and the estimating generates a set of N attenuation values, and the estimating applies an attenuation value from the set of N attenuation values to a segment of the data samples in an input data packet.

In another embodiment, a parameter estimation processor is configured to estimate parameters used to compress data for transmission over a serial data link. The parameter estimation processor includes a processor, the processor further includes user programmable inputs. The user programmable inputs set an input data packet length, a target compression ratio, and a resampling factor. The processor includes an input data packet buffer status monitor and a compressed data buffer status monitor. The processor performs a function that: (a) adjust a target compression ratio by a first compression ratio to determine a remaining compression ratio when the resampling operation is enabled; (b) estimates a set of compression parameters that are used to achieve the remaining compression ratio, the set of compression parameters includes an attenuation value, filter order, a type of encoding; and (c) sends the set of compression metrics to a data sample compressor, the data sample compressor applies the compression parameters to a packet of input data and outputs a plurality of compressed data words.

In one embodiment a first packet of input data is sent to the parameter estimation processor. The parameter estimation processor uses achieved compression ratio information to estimate a set of compression parameters to be applied to a second packet of input data where the second packet of input data is compressed after the first packet of input data is compressed.

In another embodiment, the parameter estimation processor estimates compression parameters for a first channel of resampled input data samples, at a first clock frequency. A multiplexer receives inputs from a plurality of parameter estimation processors. Each parameter estimation processor operates on a separate channel of resampled input data samples. The multiplexer multiplexes together the inputs from the plurality of parameter estimation processors and the resampled input data samples. The output of the multiplexer is compressed additionally to achieve the target compression ratio and the additional compression occurs at a clock frequency which is greater than the first clock frequency.

In another embodiment, a method to compress data for transmission over a serial data link includes distributing a target compression ratio across a plurality of processes, wherein a parameter estimation processor assigns a compression ratio contribution to each process and a sum of the compression ratio contributions is approximately equal to the target compression ratio. Input data is resampled in a first process. The resampling accomplishes a first compression ratio contribution toward achieving the target compression ratio. Resampled input data results from the resampling. The attenuating accomplishes a second compression ratio contribution toward achieving the target compression ratio. Attenuated resampled input data results from the attenuating. Redundancy is removed from the attenuated resampled input data. Removing redundancy accomplishes a third compression ratio contribution toward achieving the target compression ratio. A shortened attenuated resampled input data results from the removing redundancy. The shortened attenuated encoded input data is resampled input data in a fourth process. The encoding accomplishes a fourth compression ratio contribution toward achieving the target compression ratio. Encoded compressed data results from the encoding, wherein degradation of the encoded compressed data is reduced by distributing the target compression ratio across the four processes.

In one embodiment distributing a target compression ratio utilizes compression parameters. The compression parameters include resample parameters, redundancy filter order, attenuation value, and encoding method to allocate the compression ratio contributions. In one embodiment, attenuating divides an input data packet into N segments and the attenuating generates a set of N attenuation values, an attenuation value from the set of N attenuation values is applied to a segment of the data samples in a resampled data packet.

In one embodiment, the encoding is variable-length encoding and a buffer is used for generation of packets of compressed data words. In one embodiment, the variable-length encoding is Block Floating Encoding. In one embodiment, the encoding is Fixed-Length Encoding.

In one embodiment, distributing a target compression ratio makes adjustments in the compression ratio contributions to ensure that the packets of compressed data words are of a fixed-length.

In one embodiment, the resampled input data are buffered while the parameter estimation processor estimates compression parameters for the resampled input data.

In one embodiment, a data sample compressor configured to communicate with a parameter estimation processor to compress data for transmission over a serial data link, includes a data resampler. The data resampler is configured to resample input data samples; the data resampler is bypassed if the input data is not over sampled. An input data buffer receives resampled data from the data resampler. Information on resampled data in the data buffer is provided to the parameter estimation processor. A data attenuator receives resampled data from the input data buffer. The parameter estimation processor provides an attenuation value. The data attenuator applies the attenuation value to the resampled data to create attenuated data. A redundancy remover receives attenuated data from the data attenuator and a filter number from the parameter estimation processor. The redundancy remover filters the attenuated data or the redundancy remover is bypassed according to information passed from the parameter estimation processor. An encoder receives data from the redundancy remover and creates encoded data words. An output buffer receives encoded data words and packs the encoded data words and header information into a packet of compressed data, such that the compressed data packets are available for transmission over the serial data link.

In one embodiment, a method to decompress compressed data received over a serial data link includes performing packet alignment on received compressed data packets and extraction of packet header information and compressed data. Decoding encoded compressed data packets, wherein the decoding is accomplished with information extracted from the packet header. Restoring data redundancy after the decoding, wherein the restoring is accomplished with information extracted from the packet header. Amplifying data magnitude after the restoring, the amplifying amplifies the data magnitude with information extracted from the packet header. Resampling is performed according to the resampling factors extracted from the packet header, wherein restored data is output.

In one embodiment, resampling is not performed and noise floor reduction is performed by low-pass filtering.

In one embodiment, in a data sample compressor the data resampler and the input data buffer operate on a first channel of input data samples at a first clock frequency. The data sample compressor includes s data resamplers. The s data resamplers receive separate channels of input data samples into s data buffers. The s data buffers are fed from the s data resamplers. The s data resamplers and the s data buffers operate at the first clock frequency. s parameter estimation processors supply compression parameters for the s channels of resampled input data samples. A multiplexer operates at a second clock frequency. The second clock frequency is at least s×m×f, where m is a maximum resampling factor among the resampling factors of the s channels, and f is the first clock frequency. The multiplexer multiplexes the output of the s data buffers and the compression parameters for the s channels to form a multiplexed data stream. The multiplexed data stream is input to the data attenuator, the redundancy remover, the encoder, and the output buffer to form multiplexed compressed data words and multiplexed compressed data packets at the target compression ratio.

In one embodiment, a data sample decompressor is configured to receive compressed data from a data sample compressor transmitted over a serial data link. The data sample compressor includes a data packet processor. The data packet processor receives compressed data packets, the data packet processor aligns compressed data packets to extract header information and compressed payload data. A decoder receives compressed payload data and header information and decodes the compressed payload data according to the encoding method used. A redundancy restorer restores the redundancy to the payload data by applying a filter function using information from the packet header or the redundancy restorer is bypassed. A data scaler removes the amplitude attenuation of the payload data. The data scaler receives information from the packet header that is used to scale the payload data. A data resampler either restores the oversampling if oversampling was present in the input data or the data resampler is bypassed according to information extracted from the packet header, such that the decompressed data packets are ready for transmission to a user function.

In one embodiment, the redundancy restorer applies a finite impulse response (FIR) filter of order n, where n is obtained from the data packet header.

In one embodiment in data sample decompressor, the compressed data packets are multiplexed compressed data packets from m separate data channels. The channel number and the compression parameters are part of the compressed data packet header. The data packet processor the decoder and the redundancy restorer process the multiplexed compressed data packets at a second clock frequency. The second clock frequency is at least s×m×f, where m is a maximum resampling factor among the resampling factors of the s channels, and f is the first clock frequency. The data sample decompressor includes a demultiplexer. The demultiplexer demultiplexes the multiplexed compressed data packets at the second clock frequency, to recover the s separate resampled data channels. Each of the s separate resampled data channels is resampled in parallel to obtain the reconstructed s separate data channels.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

A unified compression and decompression framework of signal samples for transfer in base transceiver systems is described. Example architectures of base transceiver systems in which embodiments of the invention may be practiced include a general base station, OBSAI or CPRI base stations and distributed antenna systems (DAS).

Figure 1A:
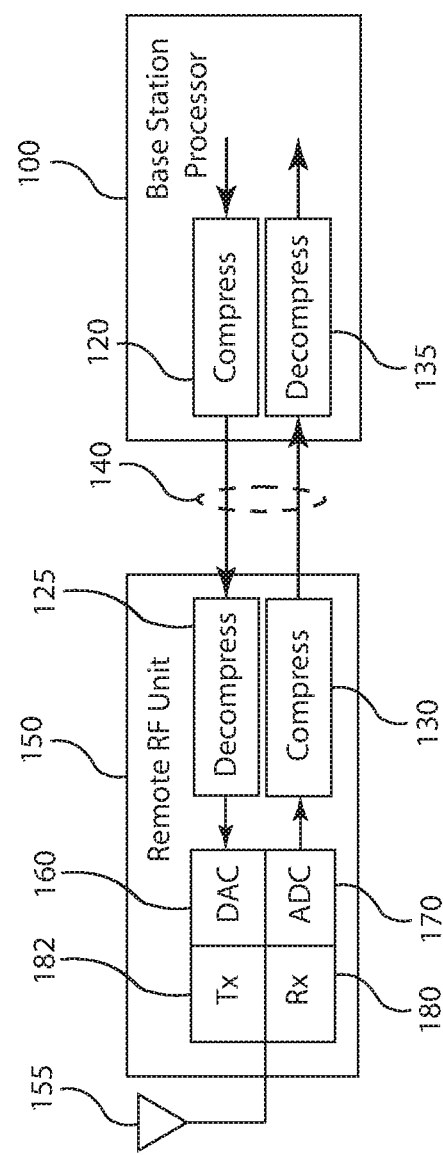
FIG. 1A is a block diagram of a general base station architecture that incorporates compression and decompression.

FIG. 1A is a block diagram of a general base station architecture that incorporates compression and decompression in accordance with the technology described herein. The BTS architecture includes the base station processor 100 connected by one or more serial data links 140 to an RF unit 150. This general architecture can be used for any air interface standard employed by a wireless communication network, including GSM/EDGE, code division multiple access (CDMA) based modulation formats, orthogonal frequency division multiplexing (OFDM) based modulation formats such as WiMax and other signal modulation formats that may evolve. The remote RF unit 150 can be located near the antenna 155 on an antenna tower. The RF unit 150 can be connected to multiple antennas for transmission, reception, diversity or beamforming. The serial data link 140 can be implemented by fiber optic, coaxial cable or RJ-45 twisted pair. The base station processor 100 performs signal processing functions to prepare data for transmission by the RF unit 150 or to recover data from signal samples received from the RF unit 150. The types of functions performed by the base station processor include symbol modulation/demodulation, channel encoding/decoding, spreading/despreading for CDMA, forward/inverse fast Fourier transformation for OFDM, diversity processing for transmission/reception, interference cancellation, equalization, time and frequency synchronization, upconverting/downconverting, multiplexing/demultiplexing and data transport to/from an external network (not shown).

For the transmit path, or downlink, the base station processor 100 performs the signal processing functions to modulate communication data that were extracted from previously received wireless signals or signals received from an external network to produce digital signals. The signal processing functions depend on the modulation format and can include symbol modulation, channel coding, spreading for CDMA, diversity processing for transmission, time and frequency synchronization, upconverting, multiplexing, and inverse fast Fourier transformation for OFDM. The digital signals may have a center frequency of 0 Hz, an intermediate frequency (IF) or a radio frequency (RF), depending on the system design. The compressor 120 applies compression to the samples of the digital signal to form compressed data samples for transfer over a serial data link 140 to the RF unit 150. At the RF unit 150, the decompressor 125 applies decompression to the compressed data samples to reconstruct the digital signal before digital to analog conversion. The digital to analog converter (DAC) 160 converts the reconstructed digital signal to an analog signal. The transmitter 182 prepares the analog signal for transmission by the antenna 155, including up-conversion to the appropriate radio frequency, RF filtering and amplification.

For the receive path, or uplink, antenna 155 at the RF unit 150 receives an RF analog signal representing modulated communication data from one or more wireless sources, or subscribers. The frequency band of the received signal can be a composite of transmitted signals from multiple wireless subscribers. Depending on the air interface protocol, the different subscriber signals can be assigned to certain frequency channels or multiple subscribers can be assigned to a particular frequency band. In the case of CDMA air interface protocols, the multiple subscriber signals are assigned to a particular frequency band and each subscriber signal is spread across the band using a unique spreading code. The receiver 180 performs analog operations on the RF analog signal, including RF filtering, amplification and down-conversion to shift the center frequency of the received signal from RF to an IF or 0 Hz, depending on system design The analog to digital converter (ADC) 170 converts the received analog signal to a digital signal to produce signal samples that have only real values or, alternatively, have in phase (I) and quadrature (Q) components, based on system design. The compressor 130 applies compression to the digital signal samples before transmission over the serial data link 140. At the base station processor 100, the decompressor 135 applies decompression to the compressed data samples to reconstruct the digital signal prior to performing the normal signal processing to recover communication data from the decompressed digital signal. The processing operations can include demodulating symbols, channel decoding, despreading (for CDMA modulation formats), diversity processing, interference canceling, equalizing, time and frequency synchronization, downconverting, demultiplexing, fast Fourier transformation (for OFDM modulation formats) and transporting data derived from the decompressed signal samples to an external network.

Figure 1B:
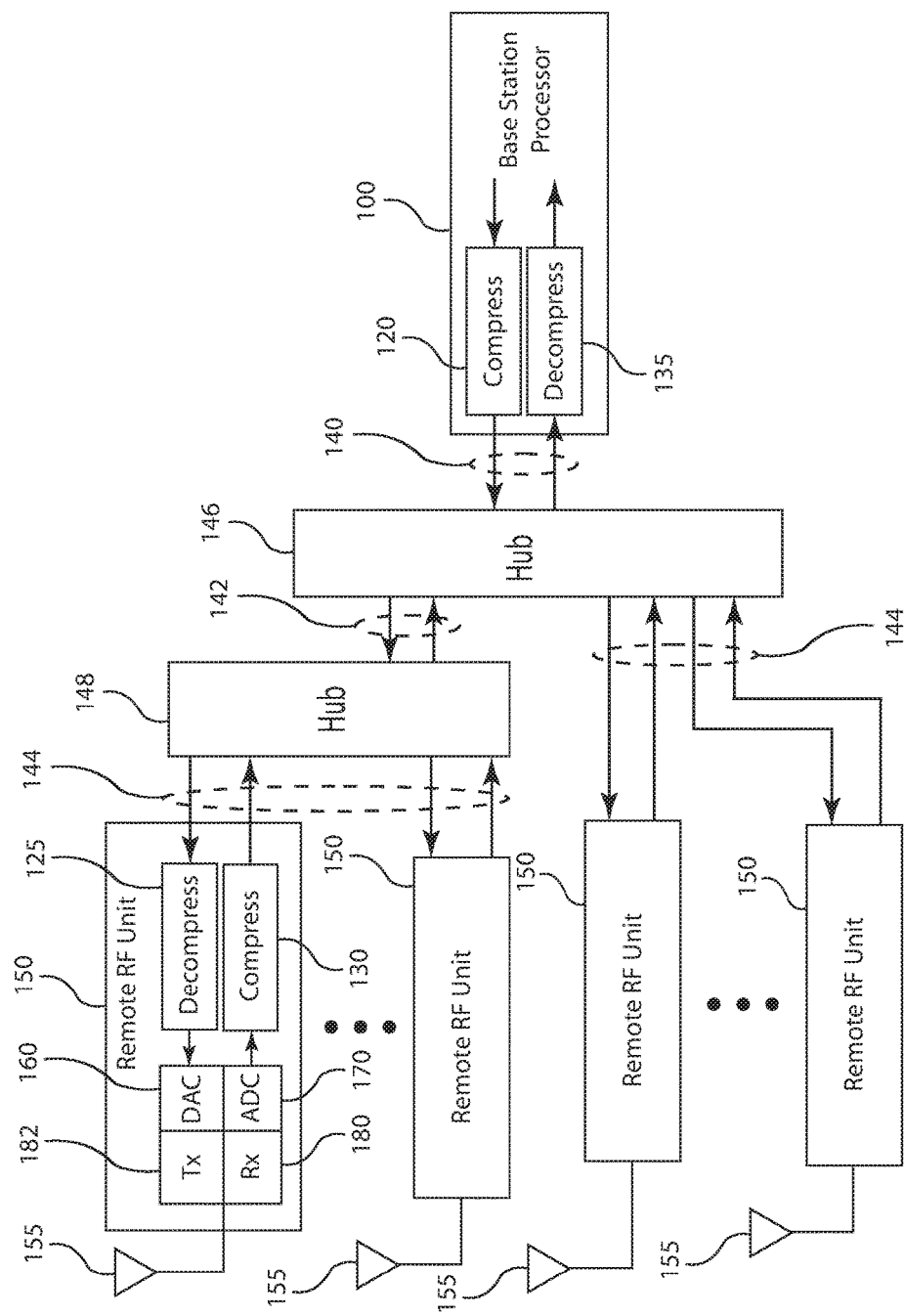
FIG. 1B is a block diagram of an example of a distributed antenna system (DAS) including compression and decompression.

The base station processor 100 and RF unit 150 may be referred to by other names in the art. A base station processor 100 can process signal samples having any center frequency, i.e. RF, IF or zero, depending on the system design. For a base transceiver system where the signal samples have a center frequency of approximately zero, or baseband signal samples, the base station processor 100 may be referred to as a baseband processor, baseband module, radio equipment controller or other terminology. FIG. 1B is a block diagram of an example of a distributed antenna system (DAS). The base station processor 100 is connected to a plurality of remote RF units 150 and their associated antennas 155. The DAS can have a plurality of remote RF units 150 that typically are located tens to hundreds of meters from the base station processor 100. The base station processor 100 is part of a main transceiver system, such as the BTS shown in FIG. 1A, that typically has collocated RF. The main transceiver may be located on the roof of a building, for example. Each remote RF unit 150 includes a compressor 130, decompressor 125, ADC 170, DAC 160, transmitter 182 and receiver 180, although these components are represented in only one remote RF unit 150 for simplicity. In this example, the base station processor 100 is connected to the remote RF units 150 via a hub 146. The hub 146 is then connected via data link 142 to another hub 148 or via links 144 to a plurality of remote RF units 150. These data links 140, 142 and 144 may have identical characteristics or may be different depending on the system design. For the transmit path, the compressor 120 at the base station processor 100 applies compression to the signal samples. The compressed data samples are transferred via data link 140 to the hub 146, via data link 142 to another hub 148 and via data links 144 to a plurality of remote RF units 150. Compressed data can remain compressed when passing through the hubs 146 and 148. At each remote RF unit 150, the decompressor 125 applies decompression to the received compressed data samples before digital to analog conversion 160. The transmitter 182 processes the resulting analog signal for transmission via antenna 155. For the receive path at each remote RF unit 150, each antenna 155 provides an analog signal to the receiver 180. The ADC 170 converts the received analog signal to a digital signal. The compressor 130 applies compression to the digital signal before transfer via the appropriate data link 140, 142 or 144 and hubs 148 and 146 to the base station processor 100. The decompressor 135 applies decompression to the compressed data samples to reconstruct the digital signal before conventional signal processing by the base station processor 100. Distributed antenna systems may transfer IF or RF digital signals over the data links 140, 142 and 144, as described with respect to FIG. 1A, or may transfer digital baseband signals as further described in the following.

The compressor 120/130 packs the compressed data samples in compressed data packets having a format compatible with the data transfer protocol of the serial data link. The compressor 120/130 adds a header portion to some or all of compressed data packets. Alternatively, the header can be encoded in overhead bits, if available for the data transfer protocol. The header portion has a defined length and includes synchronization and control information for the decompressor 125/135. The compressor 120/130 may pack the compressed data samples in any order; however the decompressor 125/135 will reorder and format the decompressed samples to comply with the data representation format expected by the BTS. The serial data link may have a proprietary data transfer protocol or a standard protocol. The decompressor 125/135 extracts the synchronization and control information from the header for decompressing and reconstructing the sequence of signal samples.

Figure 2A:
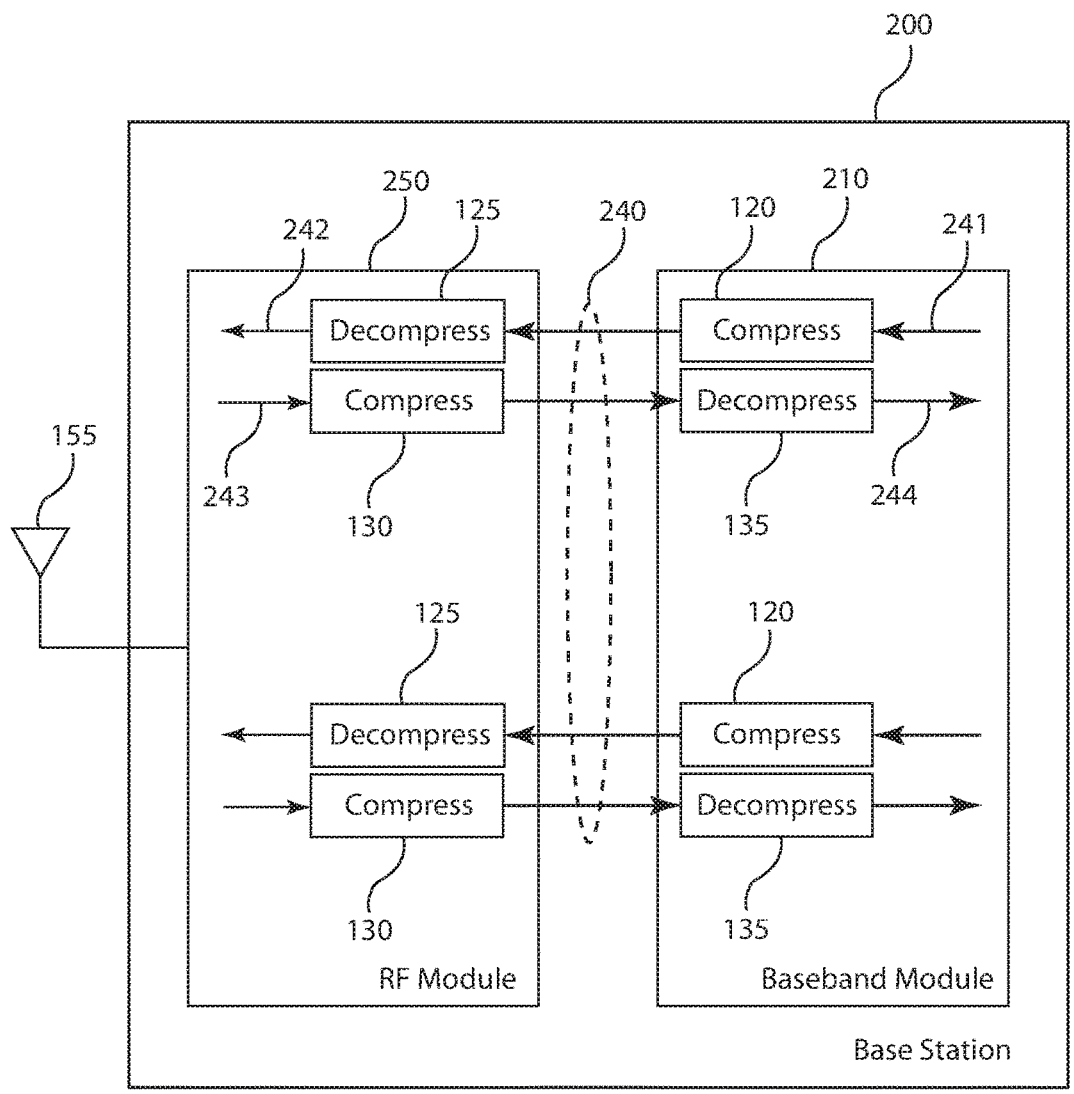
FIG. 2A is a block diagram of compression and decompression in a base station modeled after OBSAI standard.

FIG. 2A is a block diagram of compression and decompression in a base station modeled after the OBSAI standard. The OBSAI standard specifies processing and transfer of baseband I and Q signal samples. The base station 200 includes a baseband module 210 and a RF module 250 connected via one or more RP3 serial data links 240. There can be multiple baseband modules 210 in communication with multiple RF modules 250. The OBSAI architecture supports the air interface standards for GSM/EDGE, CDMA, WCDMA and WiMax for fixed or mobile access. The OBSAI standard can also accommodate other wireless network configurations or signal modulation formats by incorporating general purpose modules. The baseband module 210 performs signal processing functions on baseband signal data appropriate for the modulation format. The signal processing functions can include symbol modulation/demodulation, channel coding/decoding, spreading/despreading, diversity processing for transmission/reception, interference cancellation, equalization, time and frequency synchronization, inverse/forward discrete Fourier transform, as appropriate for the air interface standard or other modulation format, and data transport to/from an external network (not shown). The RF module 250 may contain transmit functionality only, receive functionality only, or both transmit and receive functionalities. The OBSAI RF module functions include ADC/DAC, up/down conversion, carrier selection, antenna interface, Tx/Rx RF filtering, RF combining, diversity Tx/Rx and air interface functions. Options for the serial data links 240 include fiber optic cable, copper cable or wireless transmission. The RP3 bus protocol defines the data format and line coding for data transfer. Both the baseband module 210 and the RF module 250 format the compressed data for transfer in accordance with the RP3 bus protocol.

For the transmit path, or downlink, the baseband module 210 performs various functions on communication data appropriate for the modulation format to generate baseband signal samples 241. The functions can include symbol modulation, channel coding, spreading, transmit diversity processing and inverse discrete Fourier transform as appropriate for the OBSAI supported or other signal modulation format. The compressor 120 applies compression to the signal samples 241 before transfer via the serial data link 240 to the RF module 250. At the RF module 250, the decompressor 125 applies decompression to the compressed data samples to form decompressed signal samples 242 prior to the normal processing for RF transmission.

For the receive path, or uplink, the antenna 155 receives analog RF signals representing modulated communication data from the subscribers. The compressor 130 applies compression to the digital signal samples 243 prior to transfer via serial data link 240 to the baseband module 210. At the baseband module 210, the decompressor 135 applies decompression to the compressed data samples to form decompressed signal samples 244. The baseband module 210 then applies the signal processing appropriate for the modulation format to the decompressed signal samples. The signal processing functions can include symbol demodulation, channel decoding, despreading, receive diversity processing, interference cancellation, equalization, time and frequency synchronization, forward discrete Fourier transform, as appropriate for the air interface standard or other modulation format. Although FIG. 2A depicts a point-to-point arrangement other connection arrangements are possible, including mesh topologies, bridge connections and combiner/distributor connections.

Figure 2B:
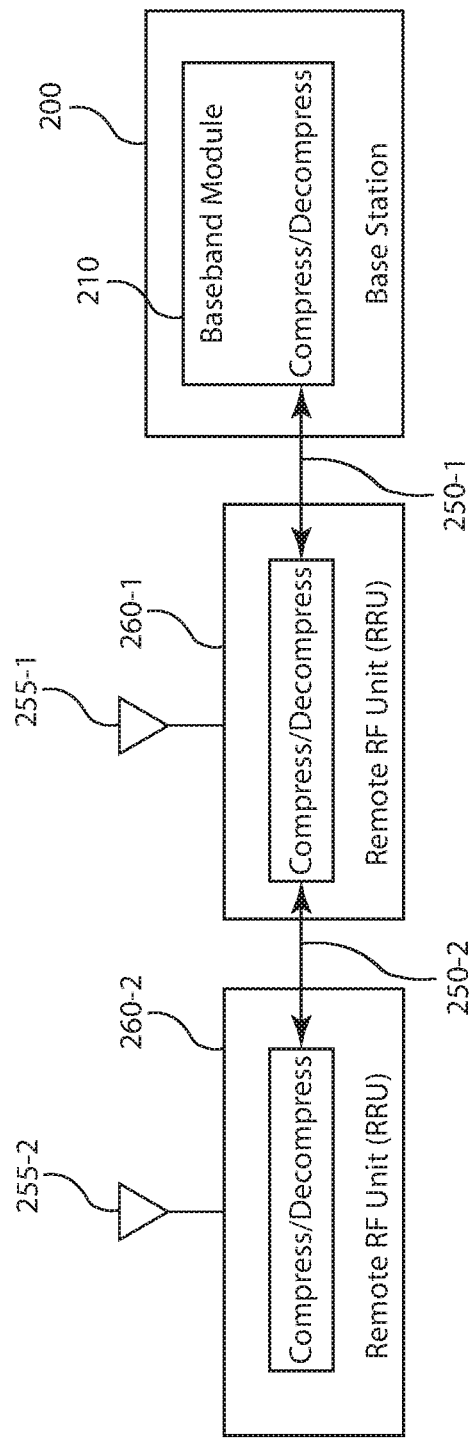
FIG. 2B is a block diagram of compression and decompression in an OBSAI compliant BTS having remote RF units.

FIG. 2B is a block diagram of compression and decompression in an OBSAI compliant BTS having remote RF units. In this example, the base station 200 is connected to two remote RF units (RRUs) 260-1 and 260-2. The serial data links 250-1 and 250-2 comply with the RP3-01 serial data link protocol as defined by the OBSAI specification. The RP3-01 protocol extends the RP3 protocol to accommodate physical layer technologies suitable for transporting data over longer physical links. A local converter (LC) implemented as a separate module or integrated with the BTS 200 or RRU 260, maps data to the RP3-01 data format. The RP3-01 protocol uses the Ethernet MAC frames in accordance with the standard IEEE 802.3-2002. A point-to-point Ethernet transfer is applied between the RP3-01 nodes, whether between RRUs 260-1 and 260-2 or between BTS 200 and RRU 260-1. The RRU 260-1 includes an Ethernet switch that determines whether a data frame is consumed at that RRU 260-1 or forwarded to the RRU 260-2. For the transmit paths, the baseband module 210 applies compression to the payload signal data prior to transfer over the data link 250-1 in accordance with the RP3-01 protocol. If the RRU 260-1 is the destination node, the RRU 260-1 decompresses the compressed data prior to processing for RF transmission from antenna 255-1. If the RRU 260-2 is the destination node, the RRU 260-1 passes the data frame with the compressed payload data over link 250-2 to RRU 260-2. The RRU 260-2 decompresses the compressed payload data for transmission from antenna 255-2. For the receive paths, the RRUs 260-1 and 260-2 apply compression to their respective received signal samples and format the compressed signal data for transfer in accordance with RP3-01 protocol. The baseband module 210 applies decompression to the compressed data received from the RRUs 260-1 and 260-2 prior to the normal baseband operations. The RRU 260-1 will pass the data frames it received from RRU 260-2 to the BTS 200 without decompressing the compressed payload data.

Figure 3A:
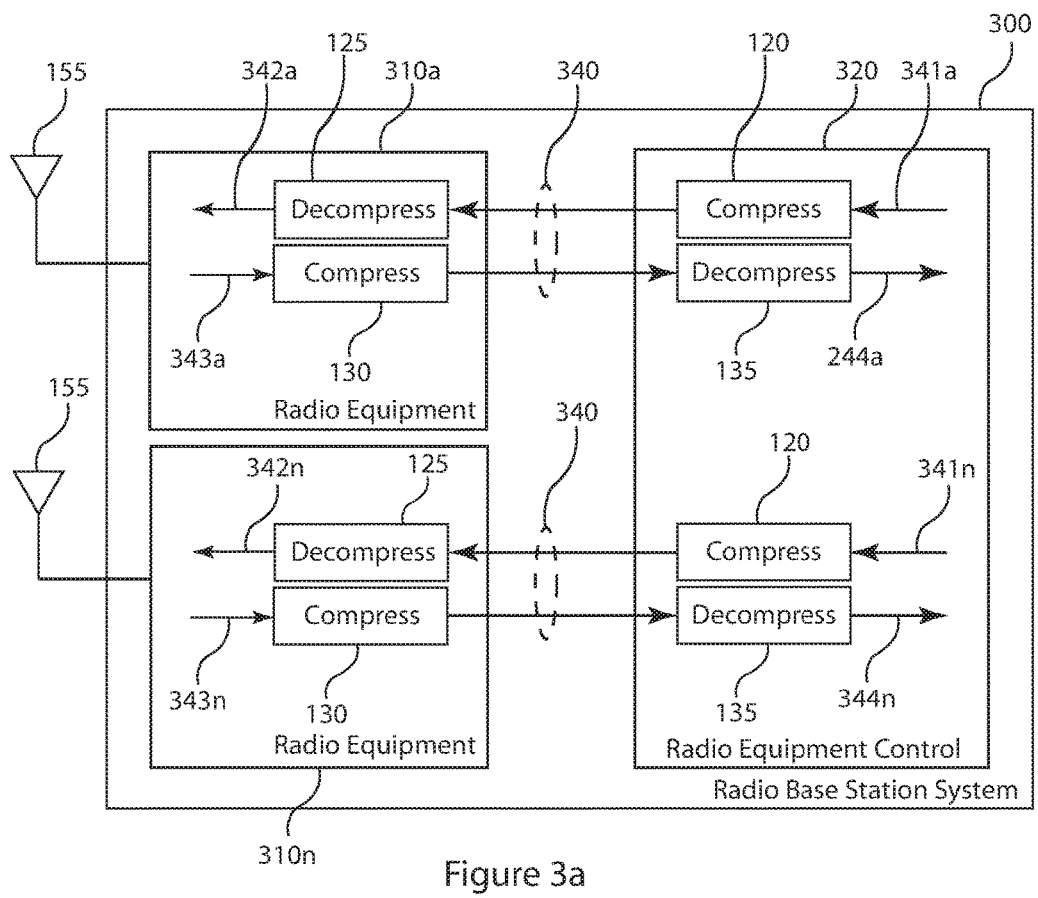
FIG. 3A is a block diagram of compression and decompression in a base station modeled after the CPRI standard.

FIG. 3A is a block diagram of compression and decompression in a base station modeled after the CPRI standard. The CPRI standard specifically supports the UTRA/FDD standard (Universal Terrestrial Radio Access/Frequency Division Duplex uses WCDMA modulation format) and the WiMax standard (IEEE802.16-2004 and IEEE802.16e-2005) but can also be used for other air interface modulation formats. In the CPRI model, the radio base station system 300 includes the radio equipment control (REC) 320 and the radio equipment (RE) 310. These two components are connected via serial data links 340 comprising bidirectional links using wire or fiber optic media. The REC 320 performs signal processing functions on baseband signal samples, including channel coding/decoding, interleaving, spreading/despreading (UTRA/FDD) and inverse/forward discrete Fourier transform (WiMax). The RE functions prepare signal samples for the air interface or generate signal samples from the received analog signal, including ADC/DAC, up/down conversion, carrier multiplexing/demultiplexing, Tx/Rx amplification and RF filtering. The RE 310 is connected to one or more antennas 155. The CPRI standard indicates 1, 2 or 6 antennas per RE with 1-4 carriers per antenna.

Figure 3B:
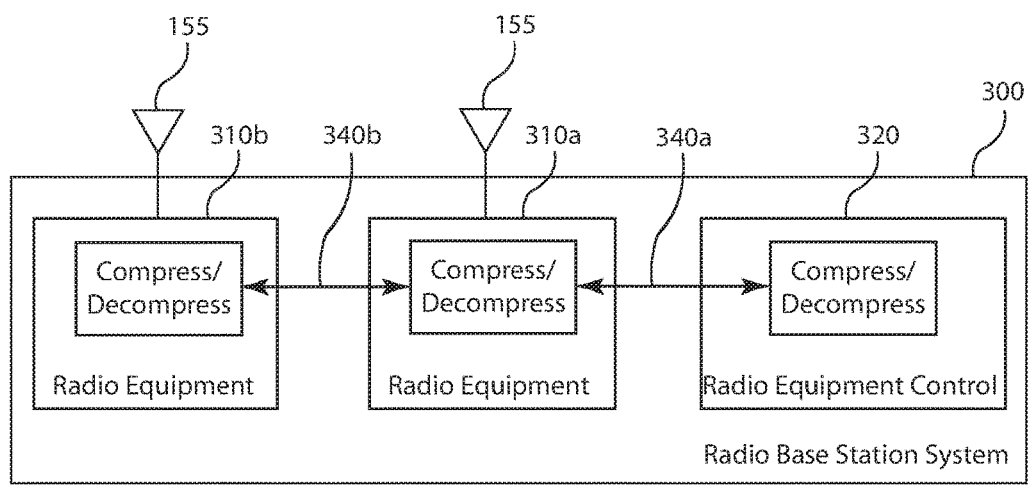
FIG. 3B shows a radio base station system 300 where the REC 320 and multiple radio equipments 310a and 310b are connected in a chain arrangement via data transfer links 340a and 340b.

For the transmit path, or downlink, from the REC 320, the compressor 120 applies compression to the signal samples 341*a* to form compressed data samples for transfer via the serial data link 340 to the RE 310. At the RE 310, the decompressor 125 applies decompression to the compressed data samples to produce decompressed signal samples 342*a*. The decompressed signal samples 342*a* are further processed for transmission over antenna 155. For the receive path, or uplink, the RE 310 processes signals received by the antenna 155 to form baseband digital signal samples 343*a*. The compressor 130 applies compression to the signal samples to form compressed data samples for transfer via the serial data link 340. At the REC 320, the decompressor 135 applies decompression to the received compressed data samples to form decompressed samples 244*a*. The REC 320 performs the normal processing functions on the decompressed samples 244*a*. FIG. 3A shows a point-to-point link between the REC 320 and the RE 310. Other topologies include multiple point-to-point links between REC 320 and RE 310 and multiple point-to-point links between one REC 320 and more than one RE 310. FIG. 3B shows a radio base station system 300 where the REC 320 and multiple radio equipment units 310*a* and 310*b* are connected in a chain arrangement via data transfer links 340*a* and 340*b*. Other topologies where REs connect to each other include tree, ring, and star topologies.

Figure 4:
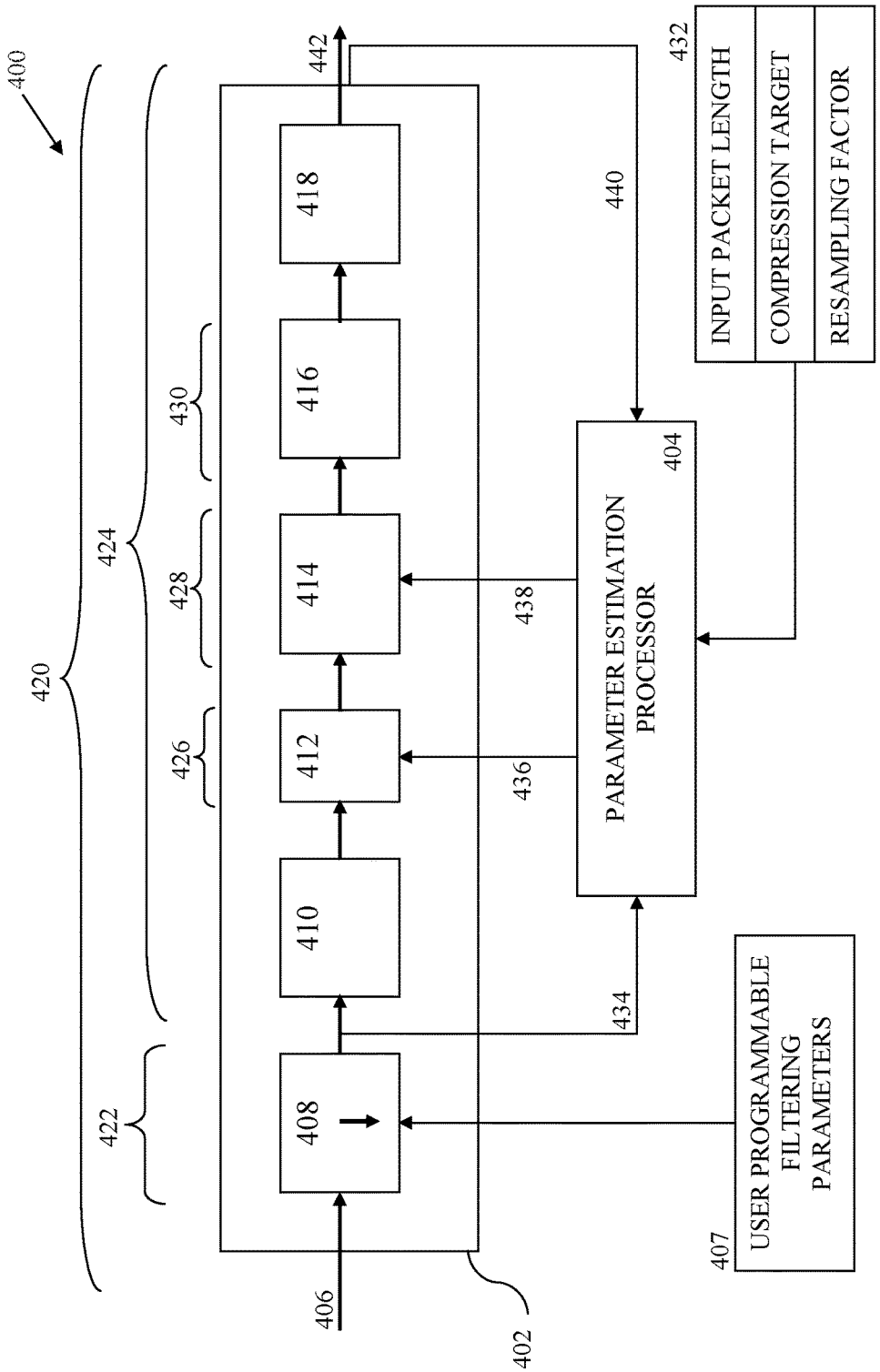
FIG. 4 illustrates a data sample compressor according to embodiments of the invention.

FIG. 4 illustrates, generally at 400, a data sample compressor according to embodiments of the invention. With reference to FIG. 4, compression module is indicated at 402. The compression module 402 is in communication with a parameter estimation processor 404. The parameter estimation processor 404 receives user programmable inputs 432 which include input data packet length, a target compression ratio, and a resampling factor. The data sample compressor receives data samples from communication signals as described above in conjunction with FIG. 1A through FIG. 3B which can be made up of in phase "I" and quadrature "Q" components, referred to as IQ data samples as inputs to the compression process. It is understood that in this description of embodiments, reference to "data samples" in the figures that follow can refer synonymously to "IQ data samples" without specially stating IQ in the description for clarity.

Some data sample transmission protocols provide for oversampling. An example of oversampling in an input data sample protocol is the Long Term Evolution (LTE) protocol which provides an actual signal at 30.72 MHz for the 20 MHz channel. This results in approximately one third additional input data bits that can be removed by resampling. Referring back to FIG. 4, input data samples 406 enter a data resampler 408. The output of the data resampler 408 connects an input data buffer 410. Resampled input data samples accumulate in the input data buffer 410. The output of the input data buffer 410 is connected to an attenuator 412. The output of the attenuator 412 is connected to into an encoder 416. The output of the encoder 416 is connected to an output buffer 418. The output of the output buffer 418 feeds a serial data link as described in the figures above.

An overall target compression ratio for the data compression architecture 400 is indicated at 420. The target compression ratio is measured between the input data at 406 and the output of the output buffer 418 where compressed data samples 442 are output in compressed data packets. The data compression architecture 400 unifies a plurality of compression processes to achieve the target compression ratio 420. The parameter estimation processor (PEP) distributes the target compression ratio 420 across a plurality of compression processes. When resampling can be performed at the data resampler 408, the target compression ratio 420 is split between a first compression ratio 422, which the data resampler 408 can accomplish and a remaining compression ratio 424 which the attenuator 412, the redundancy remover 414, and the encoder 416 accomplish with contributions from each. Each compression process, i.e., 412, 414, and 416 makes a compression ratio contribution to accomplishing the remaining compression ratio 424. The data attenuator 412 provides a compression ratio contribution 426. The redundancy remover accomplishes a compression ratio contribution 428. The encoder 416 accomplishes a compression ratio contribution 430.

The compression ratio contributions from data attenuator 412, the redundancy remover 414 and the encoder 416 are adjusted by the parameter estimation processor 404. Information on the resampled input data coming out of the data resampler 408 is buffered at input data buffer 410 and monitored by the parameter estimation processor 404 at 434. The parameter estimation processor 404 uses information on the resampled buffered input data, e.g., dynamic range, data redundancy, etc. to estimate and send compression parameters to the data attenuator 412, the redundancy remover 414 and optionally the encoder 416. Information from the output buffer on a packet of compressed data words is optionally fed back at 440 to the parameter estimation processor 404. The parameter estimation processor 404 uses the actual compression ratio achieved in a packet of compressed data samples in the next estimation of parameters for compression of the next packet of resampled data samples.

In various embodiments, user programmable inputs are provided for the data resampler 407. In some embodiments, low-pass filtering is done in the data resampler 408 and the user programmable inputs include the coefficients of the filters.

In various embodiments, the compression module 402 is implemented in an integrated circuit device, which may include an integrated circuit package containing the integrated circuit. In some embodiments, the compression module 402 is implemented in a single integrated circuit die. In other embodiments, the compression module 402 is implemented in more than one integrated circuit die of an integrated circuit device which may include a multi-chip package containing the integrated circuit.

In various embodiments, the parameter estimation processor 404 is implemented in an integrated circuit device, which may include an integrated circuit package containing the integrated circuit. In some embodiments, the parameter estimation processor 404 is implemented in a single integrated circuit die. In other embodiments, the parameter estimation processor 404 is implemented in more than one integrated circuit die of an integrated circuit device which may include a multi-chip package containing the integrated circuit.

In various embodiments, the compression module 402 and the parameter estimation processor 404 are implemented in an integrated circuit device, which may include an integrated circuit package containing the integrated circuit. In some embodiments, the compression module 402 and the parameter estimation processor 404 are implemented in a single integrated circuit die. In other embodiments, the compression module 402 and the parameter estimation processor 404 are implemented in more than one integrated circuit die of an integrated circuit device which may include a multi-chip package containing the integrated circuit.

Figure 5A:
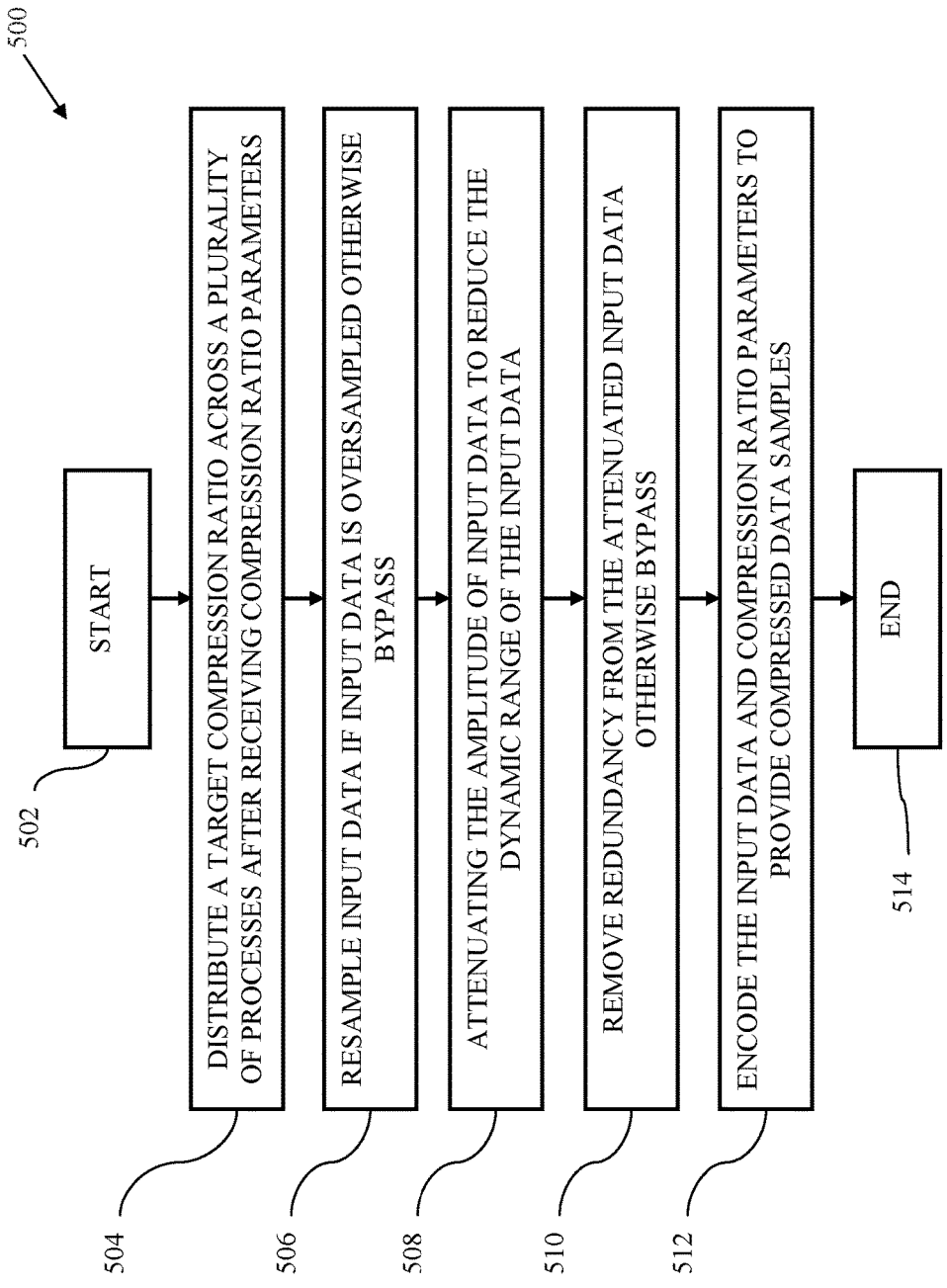
FIG. 5A illustrates a process for unifying compression of data samples according to embodiments of the invention.

FIG. 5A illustrates, generally at 500, a process for unifying compression of data samples according to embodiments of the invention. With reference to FIG. 5A, a process commences at a block 502. At a block 504, a target compression ratio is distributed across a plurality of compression processes. Compression ratio parameters are received from a parameter estimation processor such as parameter estimation processor 404 in FIG. 4. At a block 506 input data that is oversampled is resampled thereby achieving a first compression ratio, such as described above with data resampler 408, thereby achieving the first compression ratio 422 (FIG. 4). If the input data is not oversampled the data resampler is bypassed and the input data proceeds into an input data buffer such as the input data buffer 410. Resampling input data samples is described more completely below in conjunction with FIG. 6.

At a block 508 the amplitude of the data is attenuated. Attenuation of the amplitude of the data reduces the number of bits needed to represent the data thereby achieving a compression ratio contribution. In some embodiments, the attenuation value will include a fractional part to allow finer dynamic range reduction. At least one attenuation value is used per data packet. The attenuation value becomes part of the packet header information as described below in the figures that follow. In some embodiments, a data packet is divided into N segments and an N-tuple of attenuation values are used, i.e., a separate attenuation value for each segment of the data packet. Subsequent packets of data samples can be divided into a different number of segments and have therefore a different number of attenuation values that are used by a data sample compressor. In some embodiments, the integer part of a data sample is attenuated by implementing a right shift in the bits representing the data sample. A fractional part of a data sample can be attenuated by using a lookup table. Other methods know in the art can be implemented to perform attenuation. Embodiments of the invention are not limited by the method used to attenuate data samples.

At a block 510 redundancy in the data samples is removed from the attenuated data samples. Removing redundancy is described more completely below in conjunction with FIG. 7. In some embodiments, a lossless redundancy removal process is used. In other embodiments, the redundancy removal process can be bypassed.

At a block 512 the data samples are encoded by an encoder to provide encoded data samples. Encoding data samples such as using the encoder 416 achieves a compression ratio contribution and packs the information needed to decompress the data packet into header information. Various types of encoding that are currently known in the art can be used, such as block floating encoding (BFE) or fixed-length encoding techniques. Encoding data samples is described more fully below in conjunction with FIG. 8. The process ends at a block 514.

Figure 5B:
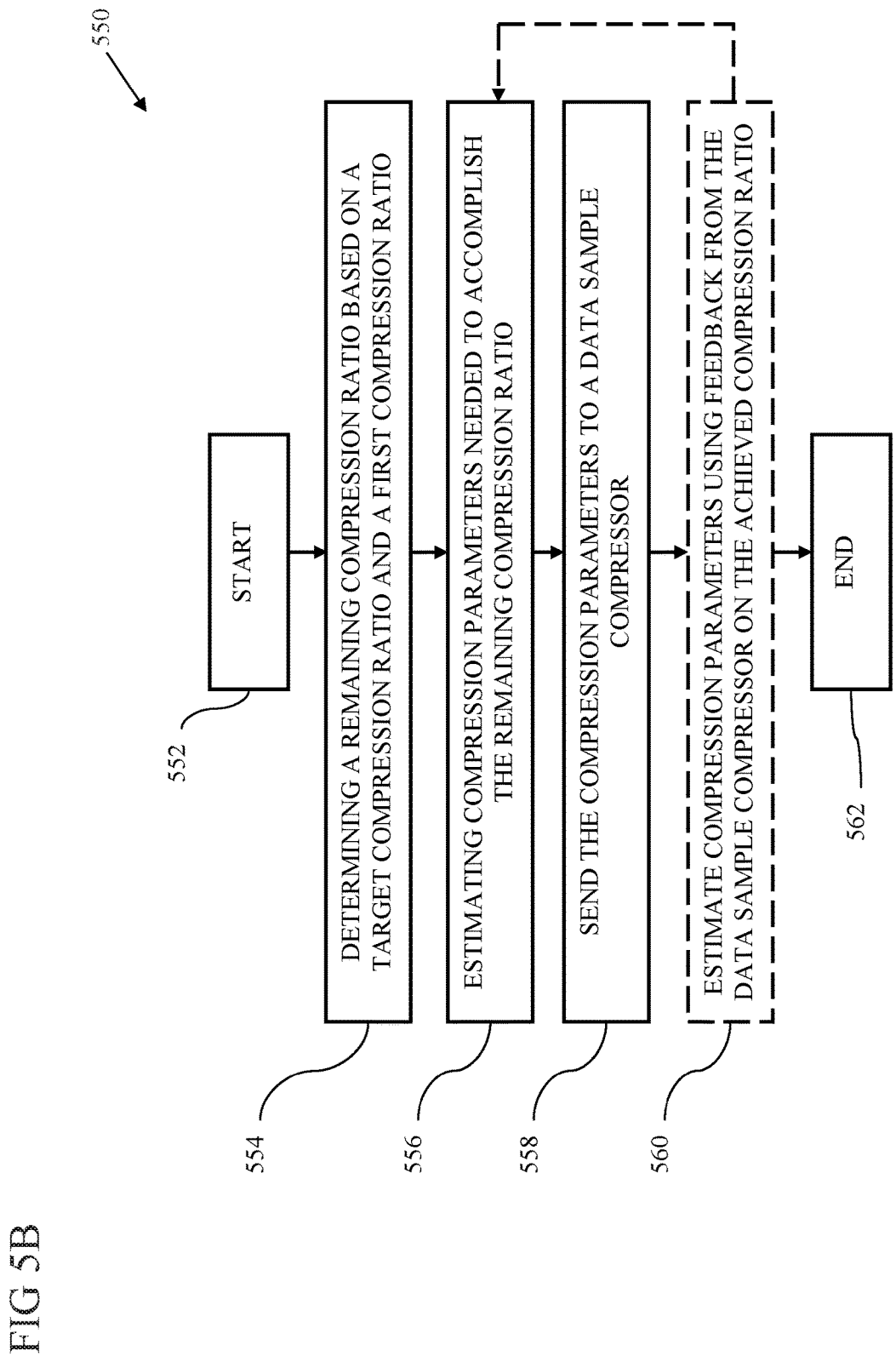
FIG. 5B illustrates a process of estimating compression parameters for use in the process of FIG. 5A according to embodiments of the invention.

FIG. 5B illustrates, generally at 550, a process of estimating compression parameters for use in the process of FIG. 5A according to embodiments of the invention. With reference to FIG. 5A, a process starts at a block 552. At a block 554 a process of determining a remaining compression ratio based on a target compression ratio and a first compression ratio is performed. In various embodiments, this process is performed by a parameter estimation processor. A first compression ratio is calculated by the parameter estimation processor by using the resampling factor. In one embodiment, a resampling factor equal to one indicates that the resampling is bypassed and that the first compression ratio is equal to unity, i.e., no compression of input data. In another embodiment, as a non-limiting example, a resampling factor equal to 2/3 is used by a parameter estimation processor to calculate a first compression ratio of 1.5:1. At a block 556 compression parameters needed to accomplish the remaining compression ratio are estimated. Such estimating can be performed by the parameter estimation processor 404 described above in conjunction with FIG. 4. Optionally at a block 560, information on the compressed data packet, such as a number of compressed data words in a packet, is fed back to the block 556 and is used to estimate the compression parameters that will be used to perform the remaining compression ratio on a new packet of data samples. In this manner, the performance of the compression process (i.e., how close an achieved compression ratio is to the target compression ratio) is used to improve compression of the next data samples that constitute a future packet. A process ends at a block 562.

Figure 6:
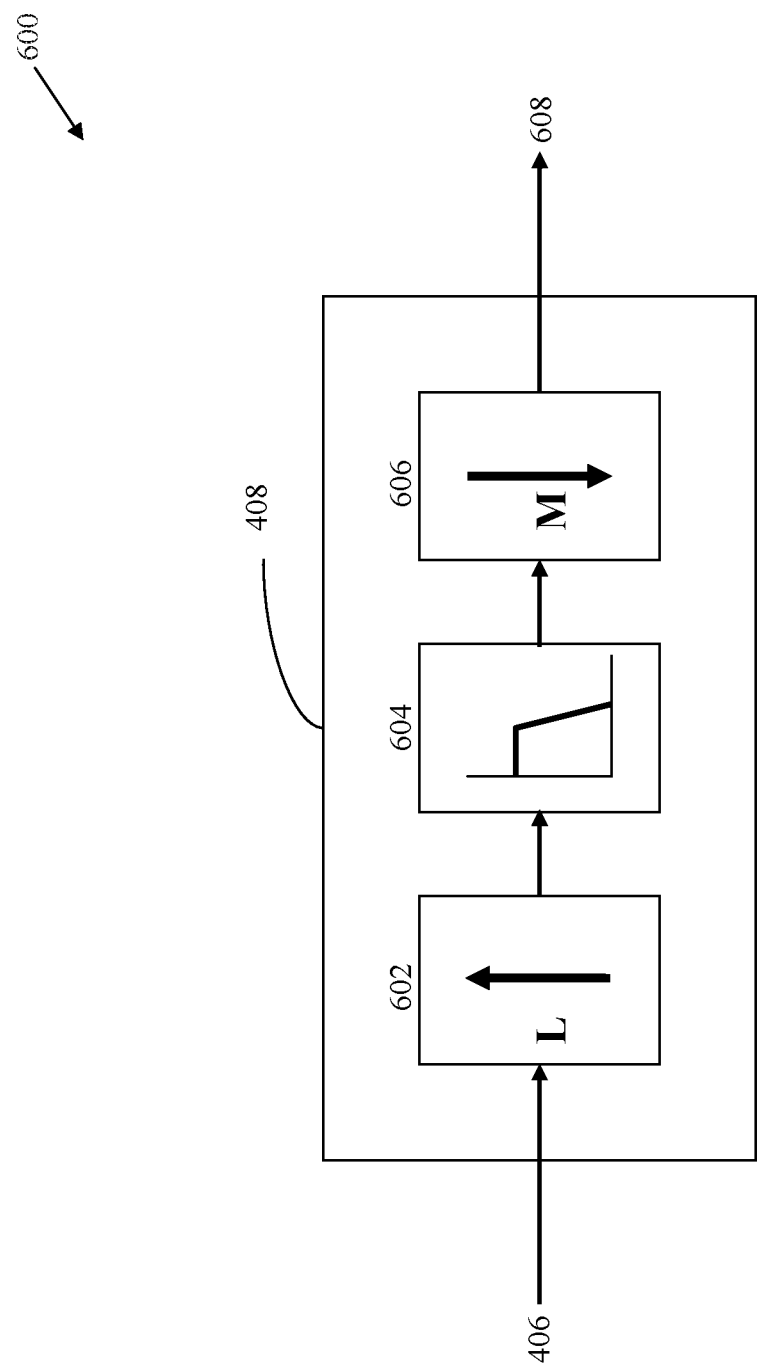
FIG. 6 illustrates resampling according to embodiments of the invention.

FIG. 6 illustrates, generally at 600, resampling according to embodiments of the invention. With reference to FIG. 6, the data resampler 408 from FIG. 4 is shown in more detail. Data resampling can be implemented in a variety of way that are know in the art. Sampling rate conversion is optional and can be bypassed. If resampling is bypassed (for example in one embodiment when the resampling factor is set to one), such information is reflected in user programmable inputs to a parameter estimation processor, such as user programmable inputs 432 to parameter estimation processor 404 (FIG. 4).

Resampling an input data stream by an amount L/M can be accomplished without loss of information across a bandwidth of interest when the resulting resampled signal meets the Nyquist criteria, i.e., $L/M \times F_s > 2 \times B$, where L and M are integers and $L/M<1$, $F_s$ is the sampling frequency and B is the bandwidth of the signal. In the example of LTE signals discussed above resampling an LTE signal by a factor of 3/4 satisfies the Nyquist criteria. Note that when a signal has been sampled at the critical frequency ($F_s=2\times B$), resampling is bypassed because the Nyquist criteria will be violated by resampling.

Resampling a signal can be implemented by any of a variety of techniques know in the art. One such technique is illustrated in FIG. 6. Up sampling is indicated at 602 using an interpolator. The output of the interpolator is low pass filtered at 604. The output of the low pass filter is then down sampled at 606. In one implementation, L−1 zero-samples are inserted between every two input samples. The low pass filter has a cut-off frequency of $F_s/2 \times L$ and can be implemented by a variety of techniques currently known in the art. Then M−1 samples are discarded for every M samples.

Figure 7:
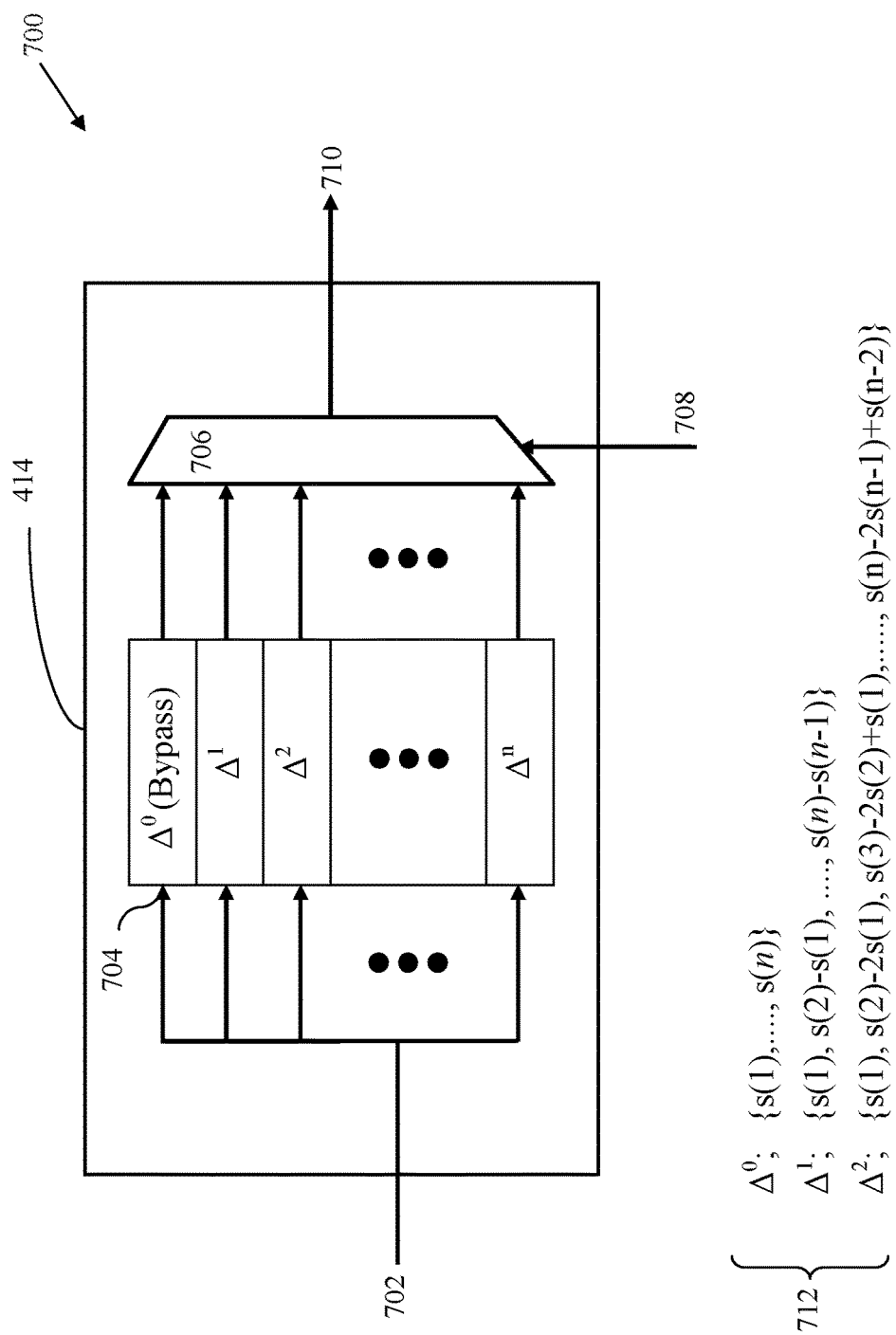
FIG. 7 illustrates lossless redundancy removal according to embodiments of the invention.

FIG. 7 illustrates, generally at 600, lossless redundancy removal according to embodiments of the invention. With reference to FIG. 7, redundancy remover 414 from FIG. 4 is illustrated in detail. In various embodiments, redundancy remover 414 is a lossless process implemented with a set of finite impulse response (FIR) filters with integer-valued coefficients suitable for various communication signals. The FIR filters reduce the numerical range of a stream of attenuated input data samples in a reversible way, thereby accomplishing a compression ratio contribution to achieving the target compression ratio for a data sample compressor.

Attenuated data samples are input at 702 into a bank of FIR filters 704, each filter in the bank of filters 704 is identified by its derivative order n, n=0, 1, 2, 3, etc. In one embodiment, the mathematical representations for the various orders of the FIR filters are shown at 712. Multiplexer 706 and filter selector 708 are used to select a particular order filter to direct to the output 710 of the redundancy remover 414. The filter order n is one of the compression parameters that the parameter estimation processor selects for a packet of data samples. Filter order n is updated by the parameter estimation processor on a packet basis and is included in the header information so that the decompressor can restore the numerical range of the data packet samples during decompression and reconstruction of the input data.

Figure 8:
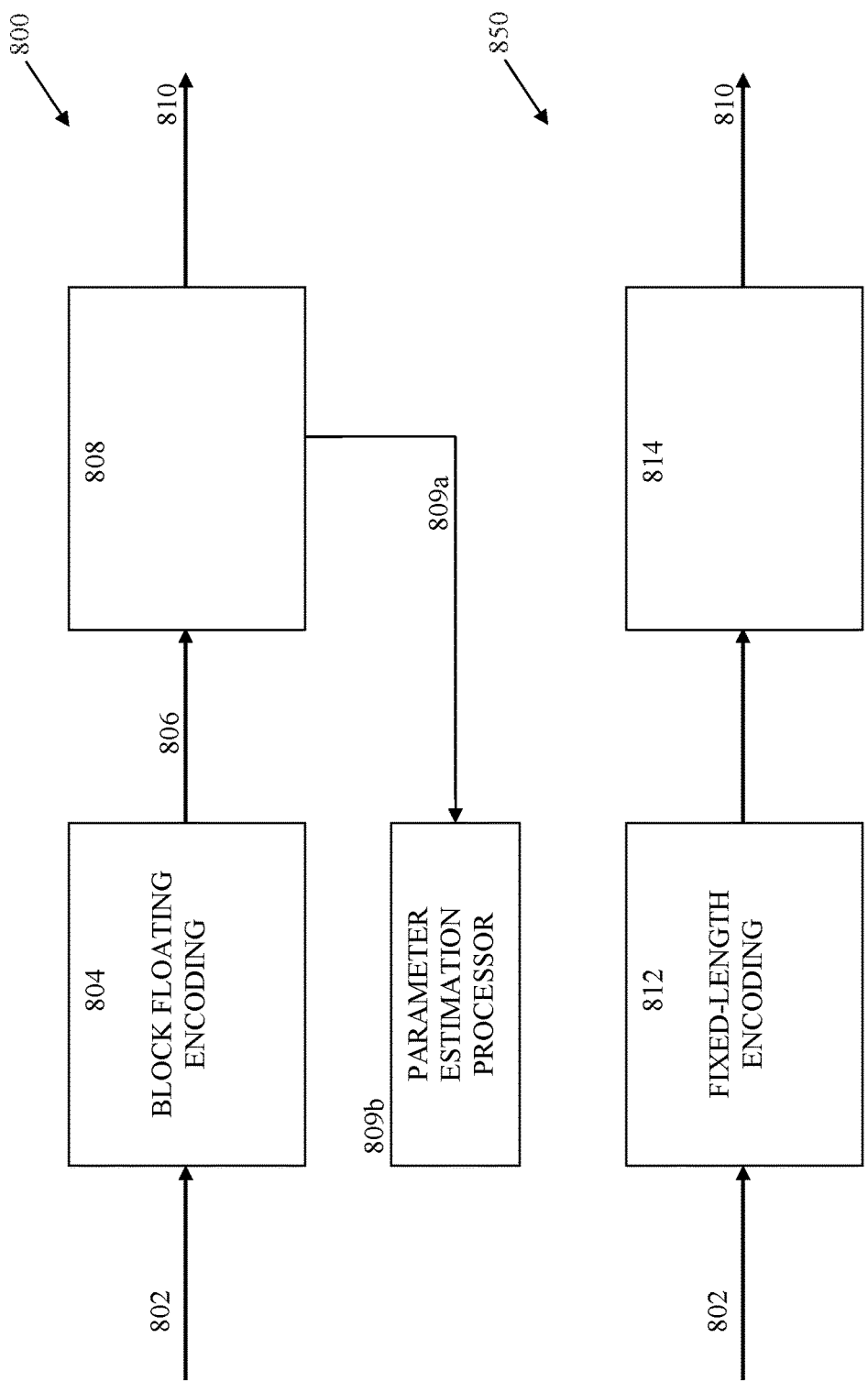
FIG. 8 illustrates several methods for encoding data samples according to embodiments of the invention.

FIG. 8 illustrates several methods for encoding data samples according to embodiments of the invention. Encoders can be used that employ variable-length encoding or fixed-length encoding. With reference to FIG. 8, data samples 802 are input into an encoder 804. In various embodiments, the encoder 804 is a variable-length floating encoder which outputs a variable number of encoded data samples for a given number of data samples input at 802. Variable-length encoding can include periods of over and/or under compression with respect to a target compression ratio. In order to accommodate the data drain rate prescribed by the target compression ratio a jitter absorption buffer is provided at a block 808. Optionally, the status of the buffer may be used to adjust the attenuation value of the attenuator block. Status of the buffer at the block 808 is provided at 809a to the parameter estimation processor 809b in order to make adjustments in the attenuation value passed to a data attenuator. The encoder 804 can be used for the encoder 416 in FIG. 4 and the block 808 can be used for the output buffer 418 in FIG. 4. The encoded output data samples are formed into compressed data packets with header information at a block 808 and output at 810 for transmission via the serial data link. Various types of variable-length encoders can be used for the encoder 804. For example, block floating encoding (BFE) can be used for variable-length encoder 804.

Alternatively, fixed-length encoding can be used as is illustrated at 850 in FIG. 8. An input stream of data samples 802 is input into an encoder 812. The encoder 812 outputs a fixed number of encoded data samples for a given number of input data samples. The encoded output data samples are formed into compressed data packets with header information at a block 814 and output at 810 for transmission via the serial data link. When a fixed-length encoder is used for data sample compression a parameter estimation processor ensures that the attenuated samples fit into their allocated number of bits.

Figure 9:
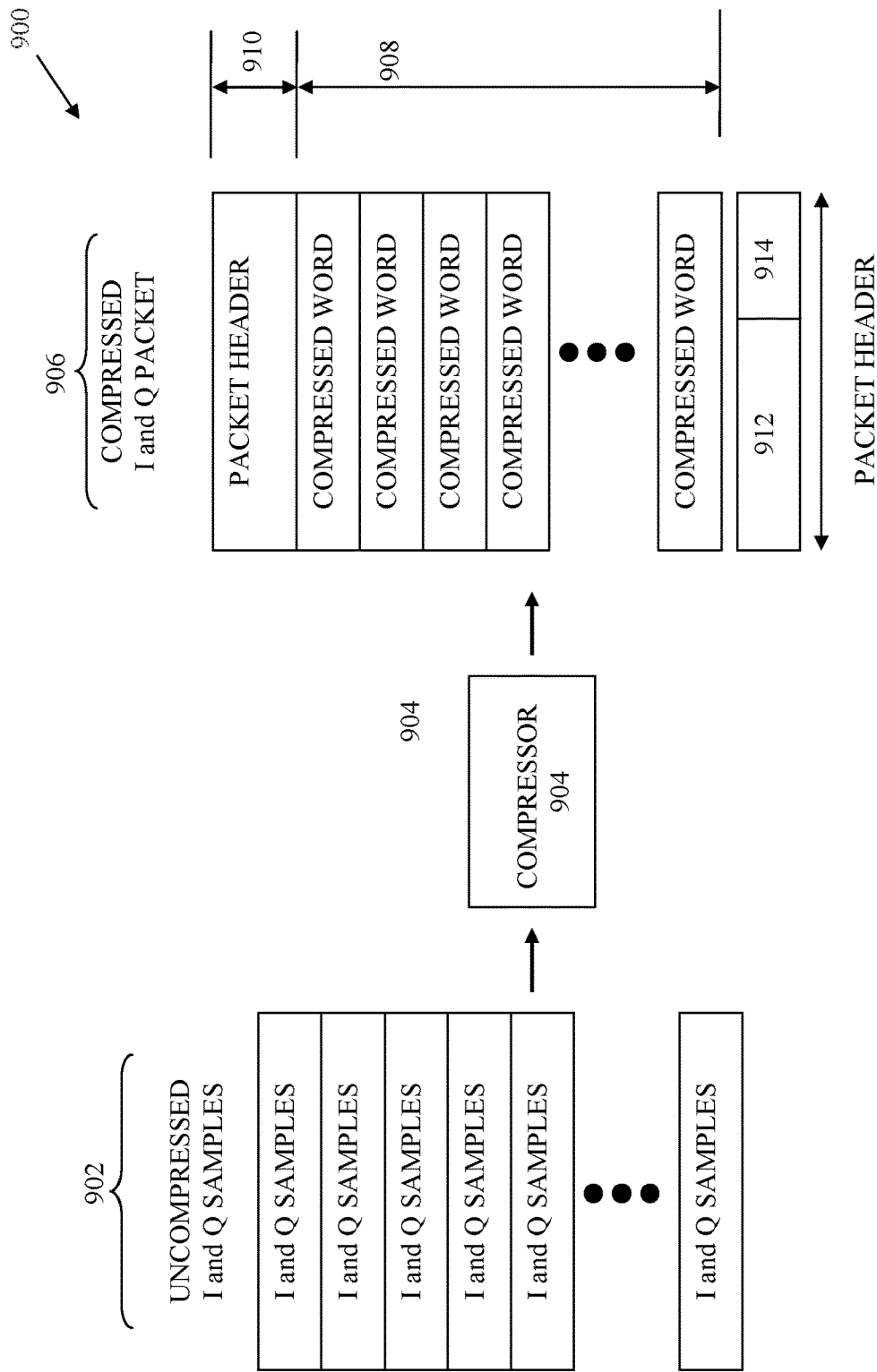
FIG. 9 illustrates a format of compressed data samples according to embodiments of the invention.

FIG. 9 illustrates, generally at 900, a format of compressed data samples according to embodiments of the invention. As described above, a compressed packet of data samples includes header information and payload data from the bit packing and encoding processes. With reference to FIG. 9, uncompressed I, Q samples 902 are input to a compression process 904. The output of the compression process 904 results in compressed IQ packet 906. The compressed IQ packet 906 has a packet header 910 and compressed payload data 908 made up of compressed data words. The packet header 910 has a part 912 which contains the compression parameters, described previously and a sync pattern 914. The sync pattern 914 is used for packet alignment at the decompressor which will be described below in the figures that follow.

Figure 10:
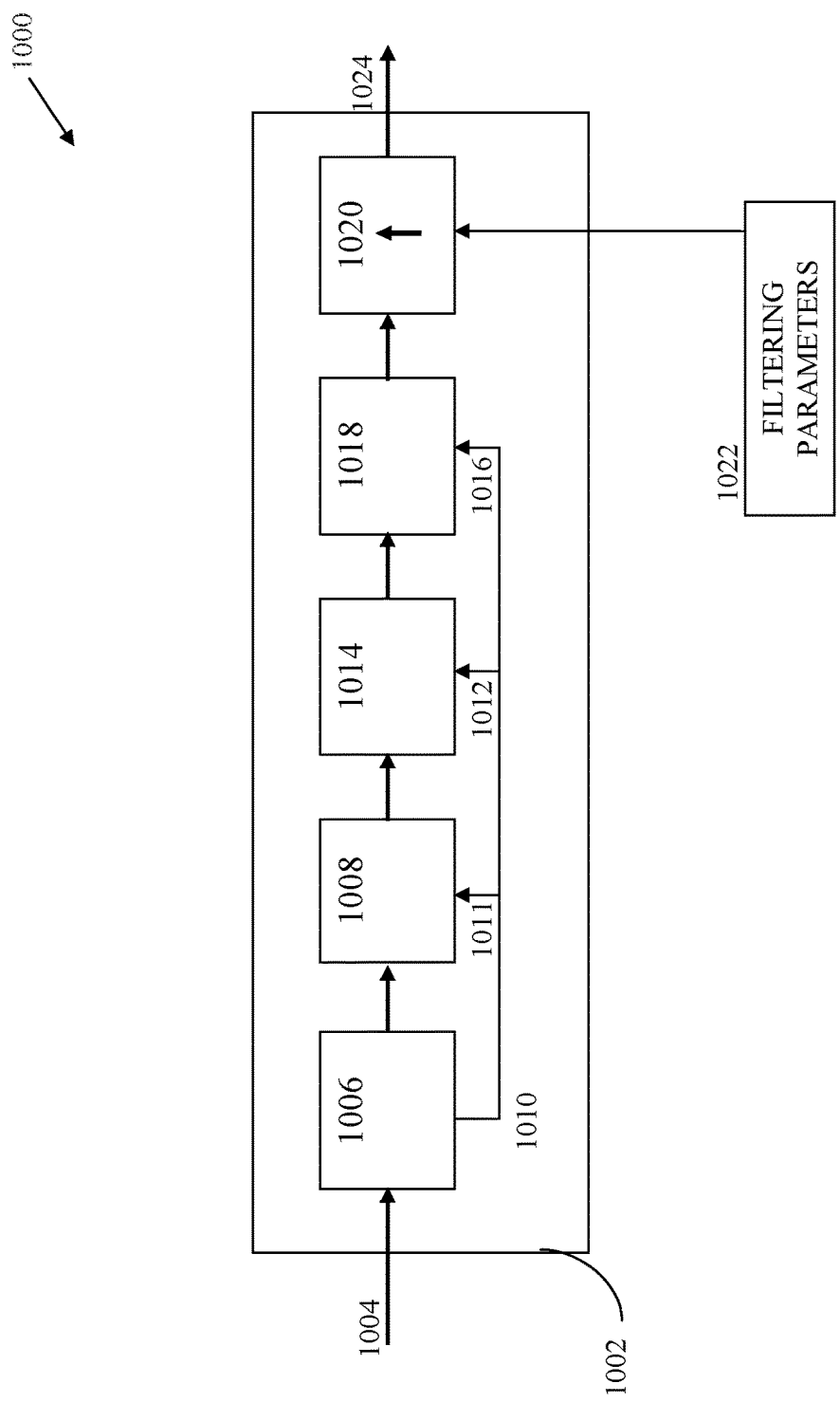
FIG. 10 illustrates a data sample decompressor according to embodiments of the invention.

FIG. 10 illustrates, generally at 1000, a data sample decompressor according to embodiments of the invention. With reference to FIG. 10, a data sample decompression module 1002 receives compressed data packets 1004 from a serial data link. A data packet processor 1006 receives and aligns the compressed data packets to extract header data information and the compressed payload data. When synchronization is obtained the header data and the compressed payload data are extracted. Header data information contains compression parameters which are passed at 1010 to the decompression processes. In various embodiments, header data can include for example, attenuation value or values, the filter number (for redundancy restoration), the encoding method and encoding information, and data packet size. Compression parameters 1011 are passed to the bit unpacker decoder 1008 to decode the compressed data words. The data is decoded and unpacked according to the method used by the compressor. The encoding method employed in an embodiment could be a design parameter of the system or in another embodiment it can be passed to the decompression module 1002 in the packet header as one of the compression parameter 1010. In one embodiment, compression parameters 1012 are passed to the redundancy restorer 1014 to restore the redundancy removed during compression. In one embodiment, compression parameters 1016 are passed to the data scaler 1018 to restore the attenuation imparted during compression. Data scaling is interchangeably referred to herein as amplifying.

Block 1020 performs resampling if the data were resampled upon input to the compression process in the data sample compressor. In one embodiment, when the input data are resampled in the compressor at a rate L/M, where L/M<1 and L and M are integers, the reciprocal resampling is applied at the block 1020 as M/L, where M/L>1. In this case, the data samples are upsampled by M and downsampled by L. Up sampling is indicated at 602 (FIG. 6) using an interpolator. The output of the interpolator is low pass filtered at 604. The output of the low pass filter is then down sampled at 606. In the corresponding implementation in the decompressor at the block 1020 (FIG. 10), M−1 zero-samples are inserted between every two input samples. The low pass filter has a cut-off frequency of $F_s/2 \times M$ and can be implemented by a variety of techniques currently known in the art. Then L−1 samples are discarded for every L samples. Thus, resampling at M/L is applied to the data samples passing through the block 1020.

If resampling was not performed during compression then it is bypassed at the block 1020. If resampling is bypassed, the data samples leaving the amplifier (data scaler) are low-pass filtered at block 1020 to reduce the noise floor and reduce adjacent channel interferences. Reconstructed data samples are output at 1024 and are available for user functions. Redundancy restoration is described more completely in FIG. 11 below.

Figure 11:
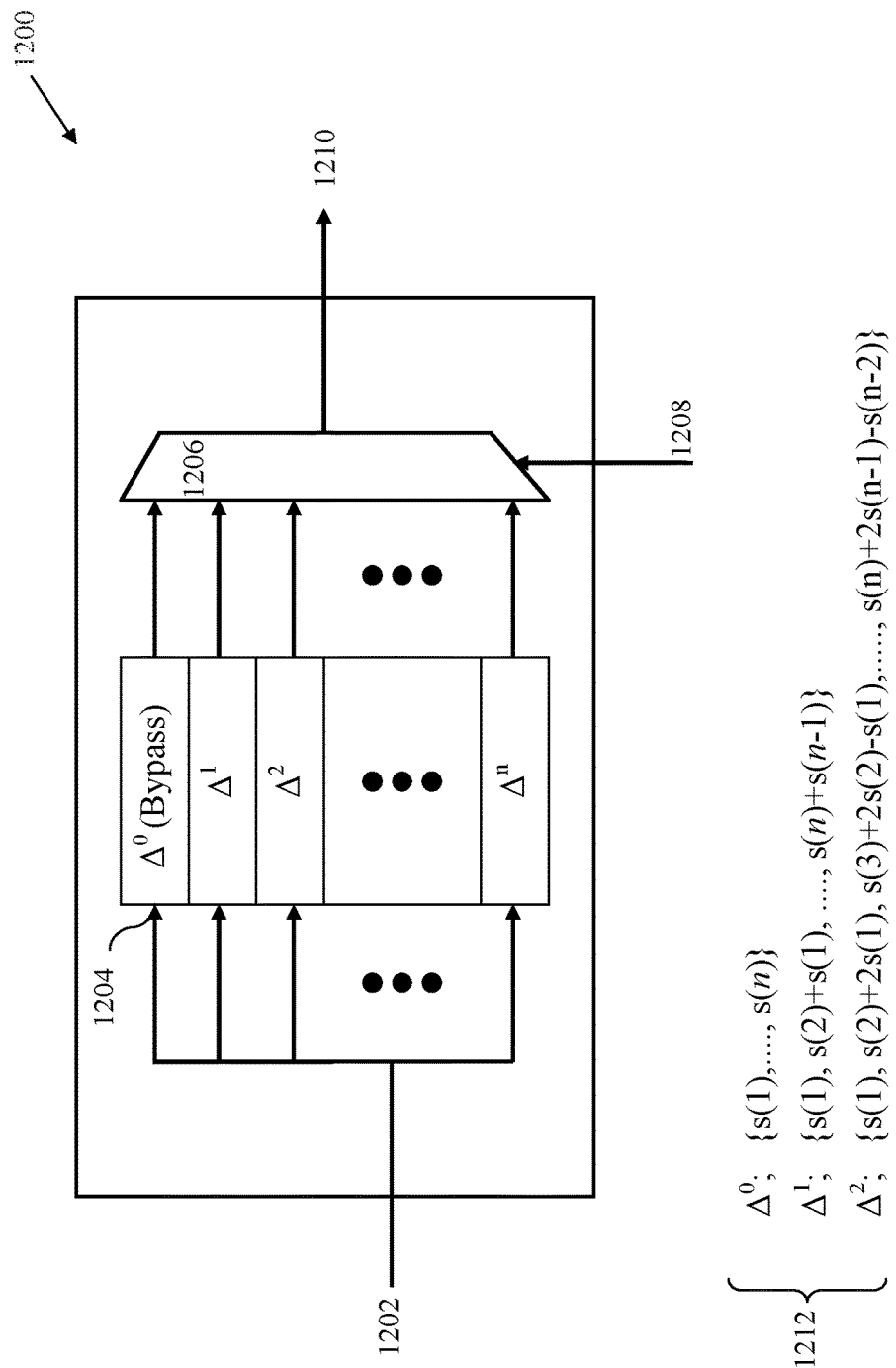
FIG. 11 illustrates lossless redundancy restoration according to embodiments of the invention.

In various embodiments, the data sample decompression module 1002 is implemented in an integrated circuit device, which may include an integrated circuit package containing the integrated circuit. In some embodiments, the data sample decompression module 1002 is implemented in a single integrated circuit die. In other embodiments, the data sample decompression module 1002 is implemented in more than one integrated circuit die of an integrated circuit device which may include a multi-chip package containing the integrated circuit FIG. 11 illustrates, generally at 1200, lossless redundancy restoration according to embodiments of the invention. With reference to FIG. 11, data samples output from a decoder, such as for example the decoder 1008 in FIG. 10, are input at 1202 into a set of finite impulse response (FIR) integration filters 1204. Filter number selector 1208 operates with multiplexer 1206 to select a particular filter from the set of filters 1204 to output at 1210, thereby restoring the redundancy that was removed during compression. Filter number 1208 is one of the compression parameters that passes to the decompressor in the compressed data sample header information. An example of an embodiment of lossless FIR filter equations is shown at 1212 for use in 1204.

Referring back to FIG. 10, data amplification 1018 restores the dynamic range of the data samples. In some embodiments, during attenuation in the compressor, the integer part of a data sample is attenuated by implementing a right shift in the bits representing the data sample. A fractional part of a data sample can be attenuated by using a lookup table. In such a case, scaling is implemented by applying a left shift to the integer part of the data sample and the fractional part of the data sample is scaled by using a lookup table. Other methods know in the art can be implemented to perform attenuation and scaling (amplifying). Embodiments of the invention are not limited by the method used to attenuate and then amplify data samples during compression and subsequent decompression.

Figure 12:
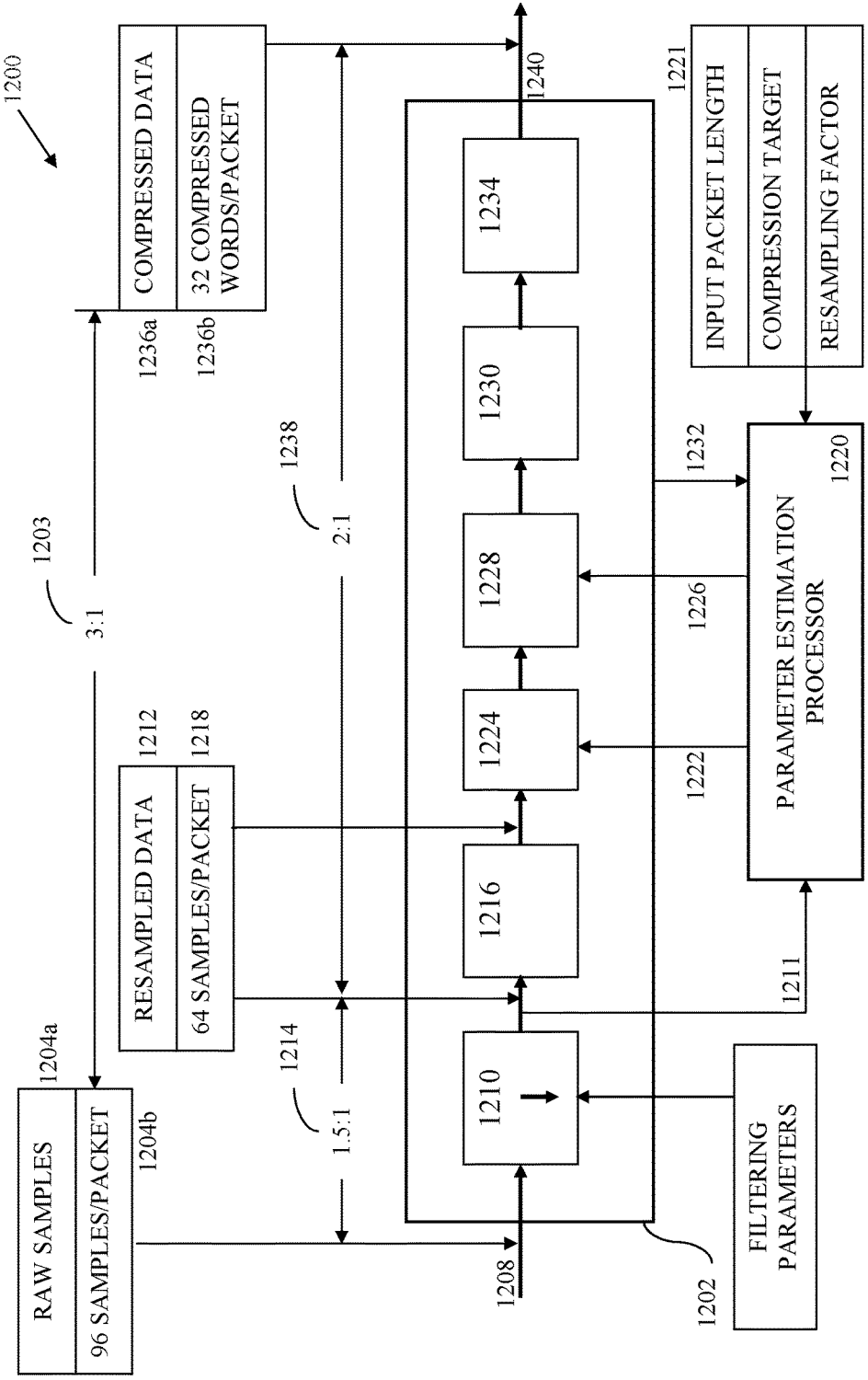
FIG. 12 illustrates an example of compressing data samples according to embodiments of the invention.

FIG. 12 illustrates, generally at 1200, an example of compressing data samples according to embodiments of the invention. With reference to FIG. 12, a compression/decompression example is illustrated with an embodiment of the invention using a target compression ratio of 3:1. In this example, a resampling factor is set to 2/3 which establishes a first compression ratio of 1.5:1. A remaining compression ratio that the rest of the compression processes must accomplish is 2:1 in order to achieve the target compression ratio of 3:1.

The data sample compressor 1202 has a data resampler 1210, an input data buffer 1216, a data attenuator 1224, a redundancy remover 1228, a bit packer/encoder 1230, and an output buffer 1234. A parameter estimation processor 1220 monitors the data accumulation in the input buffer via 1211. The parameter estimation processor 1220 receives user programmable inputs 1221, as described previously. The parameter estimation processor 1220 estimates compression parameters. An attenuation value or values 1222 is passed to the attenuator 1224, a filter number 1226 is passed to the redundancy remover 1228. Optionally the parameter estimation processor 1220 can provide information on the encoding as a compression parameter and it can pass to the bit packer/encoder 1230. Also optionally, the parameter estimation processor 1220 can monitor the status of the output buffer 1234 and use the achieved compression ratio to estimate compression parameters in light of the target compression ratio.

In operation the data sample compressor 1202 receives input data samples 1208. Input data samples 1208 are indicated as "Raw Samples" at 1204a and are depicted as 384 16-bit samples. These raw data samples are packet 96 samples per packet as illustrated at 1204b. The resampling 1210 accomplishes a first compression ratio of 1.5:1, indicated at 1214, outputting resampled data samples 1212 from the resampler 1210. The resampled data 1212/1218 have been reduced from 96 samples per packet to 64 samples per packet as illustrated at 1218. Resampled data samples 1212/1218 enter the input data buffer 1216 and experience a remaining compression ratio of 2:1, indicated at 1238 between the input to the attenuator 1224 and the output of the output buffer 1234 and packet generation operation. Compressed data samples 1236a now occupy 32 compressed words per packet and have experienced the target compression ratio of 3:1.

Figure 13:
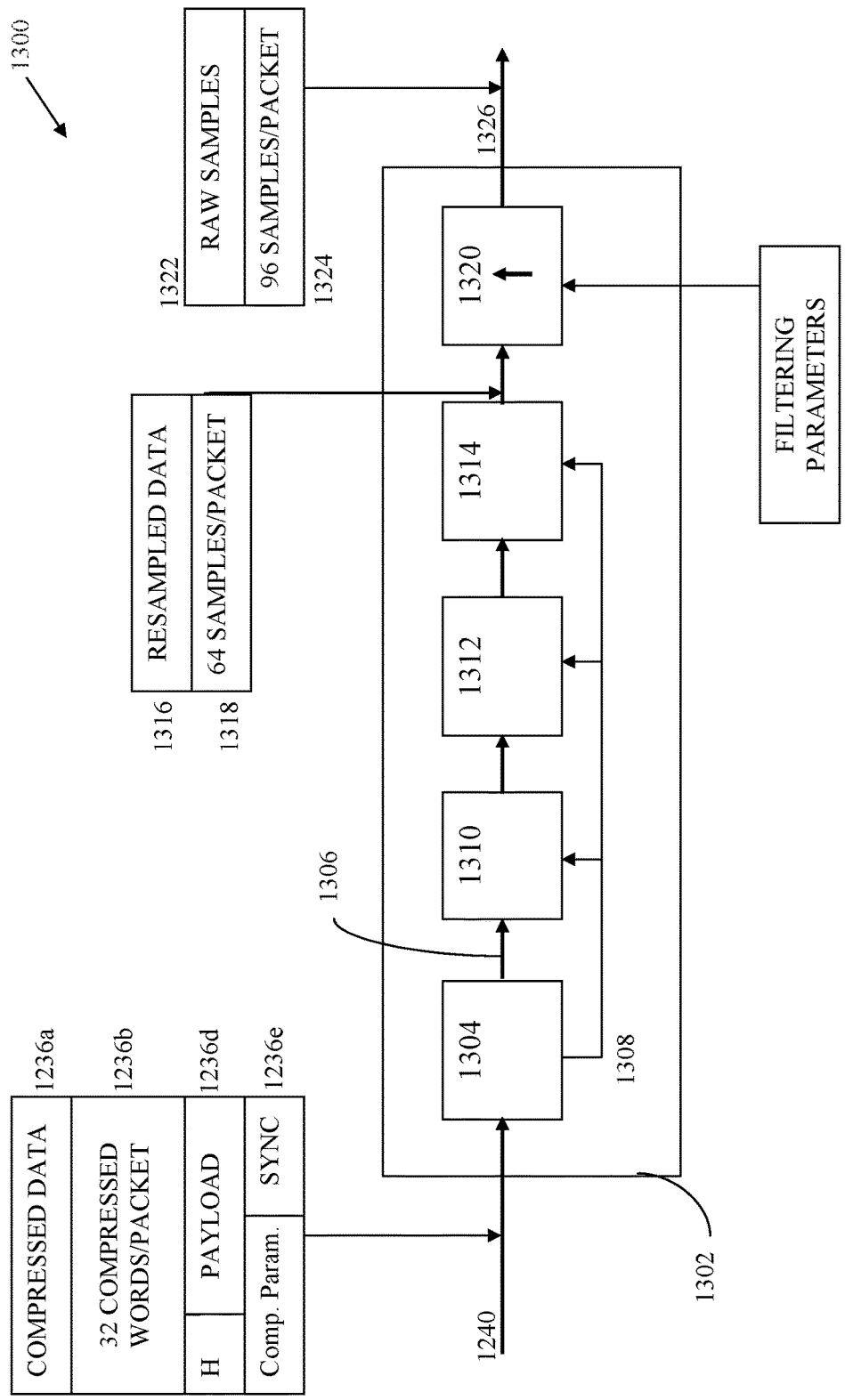
FIG. 13 illustrates, generally at 1300, an example of decompressing data samples that were compressed in the process of FIG. 12 according to embodiments of the invention.

FIG. 13 illustrates, generally at 1300, an example of decompressing data samples that were compressed in the process of FIG. 12 according to embodiments of the invention. With reference to FIG. 13, the output data 1240 (FIG. 12) is now input at 1240 into the decompressor 1302 in FIG. 13. In the decompression process the decompression processes imparted through compression are applied in the reverse order, first the 2:1 compression ratio is removed and then the 1.5:1 compression ratio is removed in order to reconstruct the compressed data.

The data sample decompressor 1302 has in order of data flow through the device a data packet processor 1304, a bit unpacker/decoder 1310, a redundancy restorer 1312, a scaler (also referred to as an amplifier) 1314 and a data resampler 1320. The input compressed data packets are first received into the data packet processor 1304. The data packet processor 1304 aligns compressed data packets, establishes synchronization and then unpacks the packet header information and the compressed data sample payload. In various embodiments, the header information contains compression parameters such as encoding information, redundancy information such as filter order number, attenuation value or values, etc. The compression parameters are sent at 1308 to the appropriate component of the decompressor for application during decompression as described above in the preceding figures.

In the example of FIG. 13, the input compressed data packets are packed at 32 samples per packet as shown in 1236b. The input compressed data packets 1240 pass through the bit unpacker/encoder 1310, the redundancy restorer 1312, and the scaler 1314, with each component imparting a decompression contribution as the input compressed data samples pass through the system. This first decompression process imparts a 1:2 decompression resulting in reconstructed data samples at a reduced rate 1316. The reconstructed data samples at the reduced rate are illustrated at 1318 as 64 samples per packet. The reconstructed data samples at the reduced rate 1316/1318 enter the data resampler 1320 are further processed to restore the resampling imparted during compression. During compression the input data samples were down sampled by a factor of 2/3. The reciprocal operation is applied at the resampler 1320 where the reconstructed data samples at the reduced rate 1316/1318 (64 samples/packet) are upsampled at 3/2 to provide reconstructed data samples 1322 with 96 samples per packet. The reconstructed data samples are ready for transmission at 1326 to user functions according to the application of a particular system as described above in conjunction with FIG. 1A through FIG. 3B.

Figure 14:
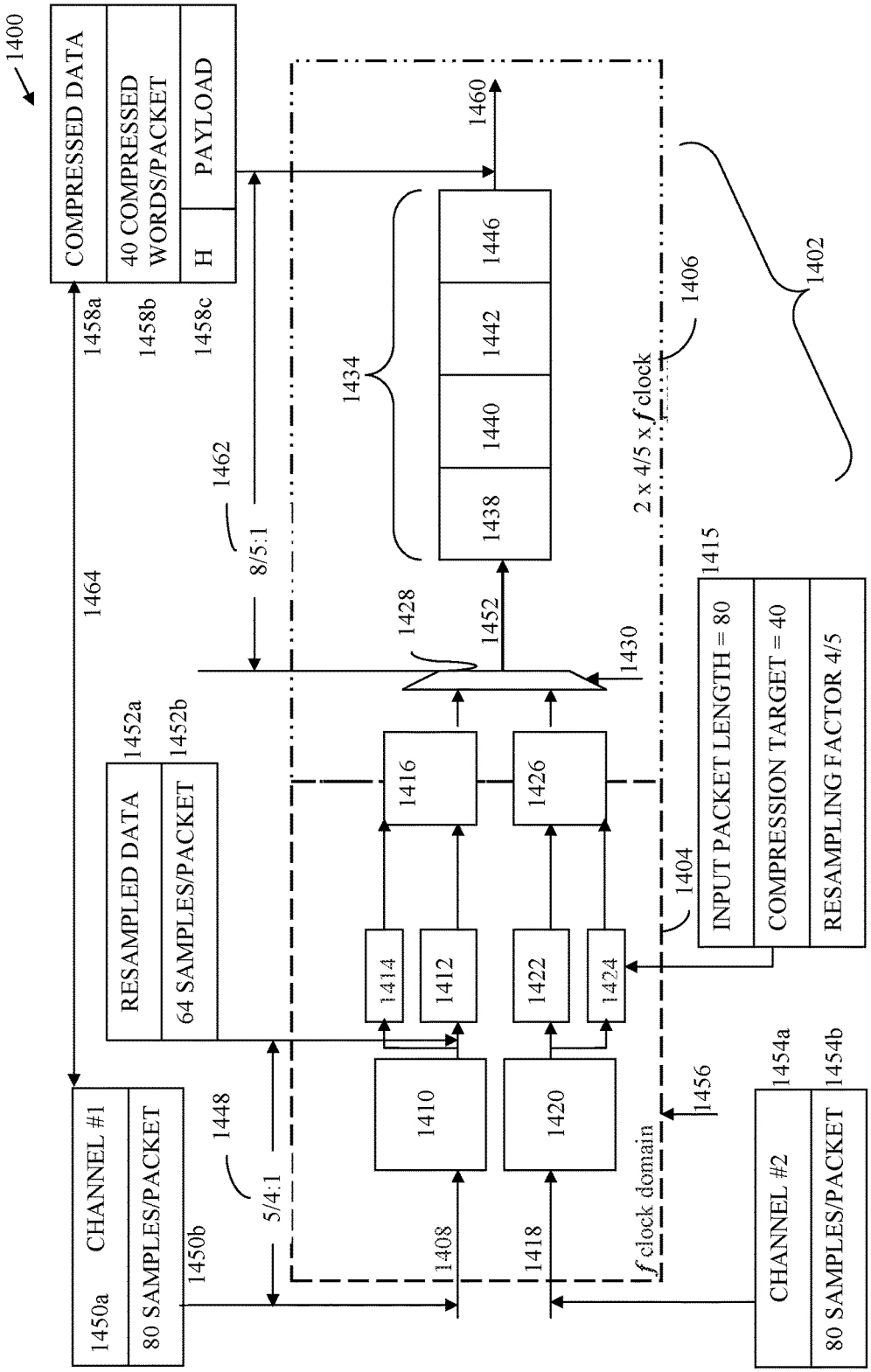
FIG. 14 illustrates an example of creating multiplexed compressed data samples according to embodiments of the invention.

FIG. 14 illustrates, generally at 1400, an example of creating multiplexed compressed data samples according to embodiments of the invention. With reference to FIG. 14, two channels of input data samples are multiplexed together, compressed, and then output to a serial data link. Each channel of input data samples is provided at a general data rate on the order of N mega bits/second (M bits/s) where N is typically a value within a range of a data transfer protocol such as for example LTE, etc. The compression process 1402 illustrated in FIG. 14 operates with two different clock domains. A first clock domain is indicated at 1404, the clock frequency for the first clock domain 1404 is indicated as f. The clock frequency f is selected to accommodate a system design data rate N and is presented herein generally, however those of skill in the art will recognize that different data rates are readily accommodated by embodiments of the invention. A second clock domain is indicated at 1406, the clock frequency for the second clock domain is indicated at 2×4/5×f since the example of FIG. 14 multiplexes two channels of input data. In general, the first clock domain operates at f and the second clock domain operates at a frequency which is at least n×m×f where n is the number of separate input channels, m is the maximum resampling factor among the resampling factors of all channels and f is the clock frequency of the first clock domain.

Compression components are distributed across the two clock domains. Input data resampling, resampled input data buffering and compression parameter estimation all occur in parallel with separate hardware channels in the first clock domain. In the second clock domain the separate resampled input data channels are multiplexed together and the rest of the compression process is applied using one set of hardware as the multiplexed data stream passes through the compression hardware serially.

In the first cock domain 1404, a first channel of input data samples 1408 are input to a data resampler 1410. The data resampler 1410 has the functionality described previously for data resamplers in the figures above. In the example of FIG. 14, the input data example for the first channel is 160 16-bit samples which are packed 80 samples per data sample packet as shown at 1450b. The data resampler provides a first compression ratio of 5/4:1 resampling the input data samples 1408/1450a/1450b by a factor of 4/5 resulting in resampled data 1452a with 64 samples per data packet as illustrated at 1452b. Similarly, a second channel of input data samples 1418 enters a second resampler 1420. Shown for the purpose of the example are 160 16-bit samples which are packed 80 samples per data sample packet as shown at 1454b. The second data resampler provides a first compression ratio of 5/4:1 resampling the input data samples 1418/1454a/1454b by a factor of 4/5 resulting in resampled data at the output of the second resampler which is configured 64 samples to a data packet, which is not shown in order to preserve clarity in the figure.

User programmable inputs 1415 are provided to a first parameter estimation processor 1414. The user programmable inputs 1415 include input data packet length of 80 samples per packet, compression target of 40 samples per packet, and resampling factor of 4/5. The first parameter estimation processor uses the user programmable inputs to establish the target compression ratio of 2:1, establish that resampling is being done by the resampler and that it is not bypassed, and a resampling factor is established for decompression. Alternatively, a second parameter estimation processor 1422 can use the user programmable inputs 1415 to establish the target compression ratio of 2:1, establish that resampling is being done by the resampler and that it is not bypassed, and a resampling factor is established for decompression. In alternative embodiments, a separate processor can use the user programmable inputs 1415 to establish the target compression ratio of 2:1, establish that resampling is being done by the resampler and that it is not bypassed, and a resampling factor is established for decompression.

The first parameter estimation processor 1414 monitors the resampled data samples entering the input data buffer 1410. The first parameter estimation processor estimates a first set of compression parameters, the first set of compression parameters are input to a first-in-first-out (FIFO) 1416 which spans both clock domains. The resampled first channel data samples 1452a/1452b are also input into FIFO 1516. Similarly for the second channel of input data samples 1418, a second parameter estimation processor 1424 monitors the resampled data samples entering the second input data buffer 1420. The second parameter estimation processor 1424 estimates a second set of compression parameters, the second set of compression parameters are input to a first-in-first-out (FIFO) 1426 which spans both clock domains. The resampled second channel data samples 1452a/1452b are also input into FIFO 1516. Although the example of FIG. 14 uses two input data channels 1408 and 1418, the process is scalable to more than 2 channels and can accommodate a general number of n channels within the bounds of hardware limitations.

The resulting resampled data samples for each channel at the first level of compression (in the example of FIG. 14 it is 5/4:1) are multiplexed together in the second clock domain 1406 to form a multiplexed data stream. The multiplexed data stream 1452 is input into the attenuator 1438, the redundancy remover 1440, bit-packer/encoder 1442, and the output buffer and packet generation at 1446. Channel compression parameters are provided at 1436 and are fed to the respective compression component as needed, i.e., 1438, 1440, 1442, and 1446. The multiplexed compressed data sample output 1460 of the compression process 1402 is illustrated at 1458a/1458b/1458c. The multiplexed compressed data samples have 16-bitwords packed 40 samples per data packet as shown at 1458b. In 1458c, a header and payload data are indicated for the first channel and a header and payload data are indicated for the second channel. In the multiplexed case, channel number is added to the header information as illustrated at 1458c. Following the first compression ratio of 5/4:1 implemented in the first clock domain 1404, the remaining compression ratio 1462 of 8/5:1 is implemented in the second clock domain 1406 for an overall compression ratio of 2:1 1464 for the system of 1400. Multiplexed compressed data packets are output at 1460 for transmission over the serial data link.

In various embodiments, the data sample compressor 1402 is implemented in an integrated circuit device, which may include an integrated circuit package containing the integrated circuit. In some embodiments, the data sample compressor 1402 is implemented in a single integrated circuit die. In other embodiments, the data sample compressor 1402 is implemented in more than one integrated circuit die of an integrated circuit device which may include a multi-chip package containing the integrated circuit.

Figure 15:
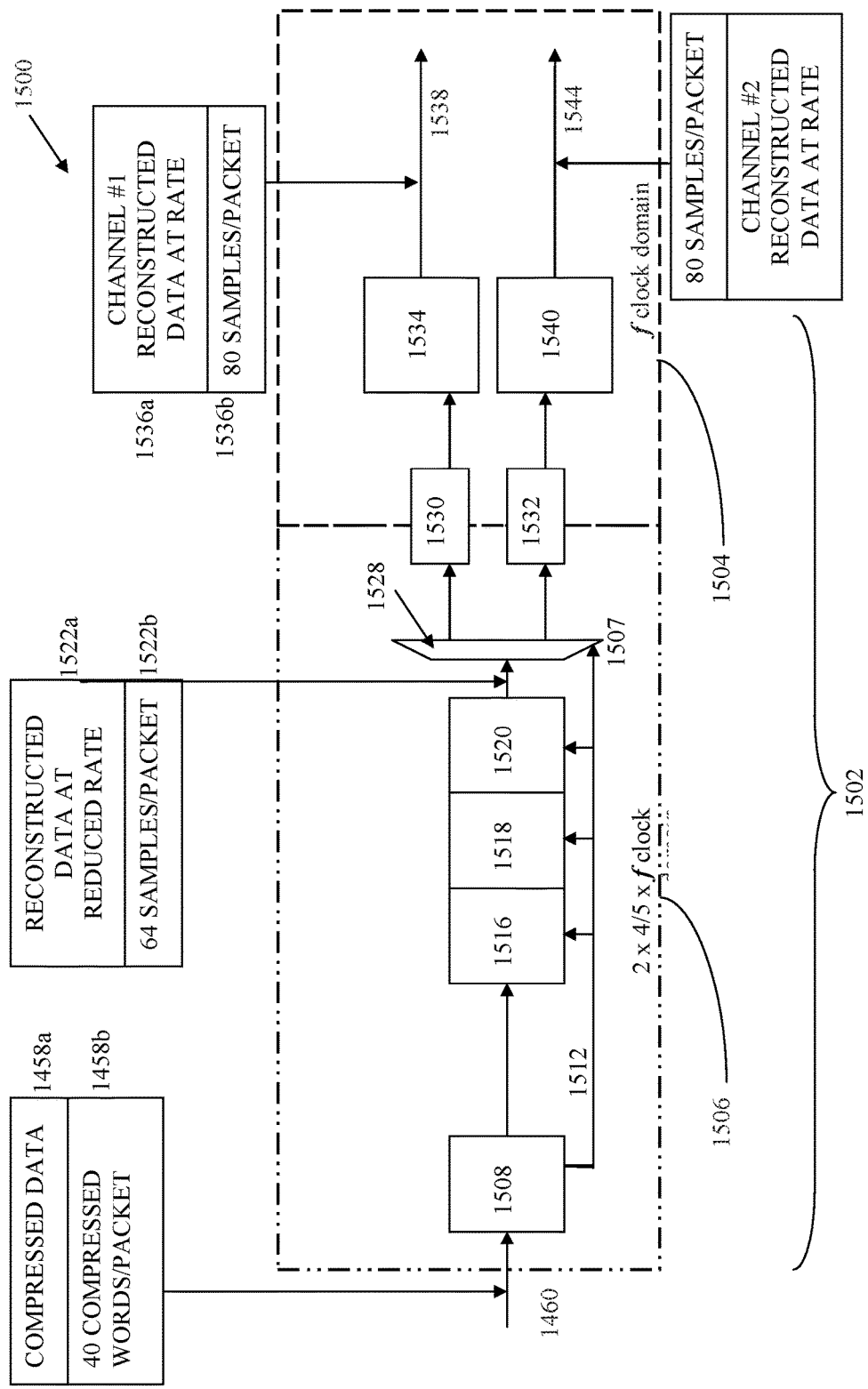
FIG. 15 illustrates an example of demultiplexing compressed data samples that were compressed and multiplexed in the process of FIG. 14 according to embodiments of the invention.

FIG. 15 illustrates, generally at 1500, an example of demultiplexing compressed data samples that were compressed and multiplexed in the process of FIG. 14 according to embodiments of the invention. In overview, with reference to FIG. 15, multiplexed compressed data packets 1460 are received from a serial data link and input to a data sample decompressor 1502. The data sample decompressor 1502 operates with two clock domains. A first clock domain indicated at 1504 operates at clock frequency f and a second clock domain, indicated at 1506 operates at a clock frequency 2/(5/4)×f. In the case of the decompressor, the input compressed multiplexed data stream 1460 enters the second clock domain operating at frequency 2×4/5×f and undergoes decompression of the 8/5:1 compression ratio as a first step in the decompression process. Note that the 8/5:1 compression ratio was performed on the compressed data samples as a last step in the data sample compressor 1402 (FIG. 14). Demultiplexing is performed in the second clock domain and then reconstructed data samples at a reduced rate are buffered at 1530 and 1532 to the clock domain 1504 operating at the lower clock frequency f. In clock domain 1504 a 5/4 resampling fully reconstructs the individual compressed data sample channels from the example of FIG. 14.

Similar to the single channel implementation, the multiplexed compressed data stream 1460 enters packet processing 1508, where synchronization occurs, packet header information is separated from compressed data sample payload. Compression parameters 1512, read from the packet header, are passed to the respective decompression components, i.e., bit-unpacker decoder 1516, redundancy restorer 1518, amplifier (scaler) 1520. Reconstructed data samples at a reduced rate, indicated at 1522a/1522b, are output from the amplifier 1520. The reconstructed data samples at the reduced rate are configured with 64 samples per packet as indicated at 1522b. The reconstructed data samples at the reduced rate 1522a/1522b enter a demultiplexer 1528 along with channel selector input 1507. The demultiplexer 1528 provides the separate channels of reconstructed data samples at the reduced rate on its output which are fed into channel buffers 1530 and 1532. Channel packet buffers 1530 and 1532 are configured as FIFO buffers with functionality similar to 1416 and 1426 (FIG. 14). Channel buffers 1530 and 1532 span both clock domains, f and 2×4/5×f Reconstructed data samples at the reduced rate for channel one are input into a resampler 1534. The resampler 1534 applies 5/4 resampling and outputs reconstructed data samples 1536a/1536b which have 80 samples per data packet as illustrated at 1536b. Similarly, reconstructed data samples at the reduced rate for channel two are input into a resampler 1540. The resampler 1540 applies 5/4 resampling and outputs reconstructed data samples 1544 which have 80 samples per data packet as illustrated at 1542. Reconstructed data samples 1538 and 1544 are available for user functions as described above in conjunction with FIG. 1A through FIG. 3B.

Figure 16:
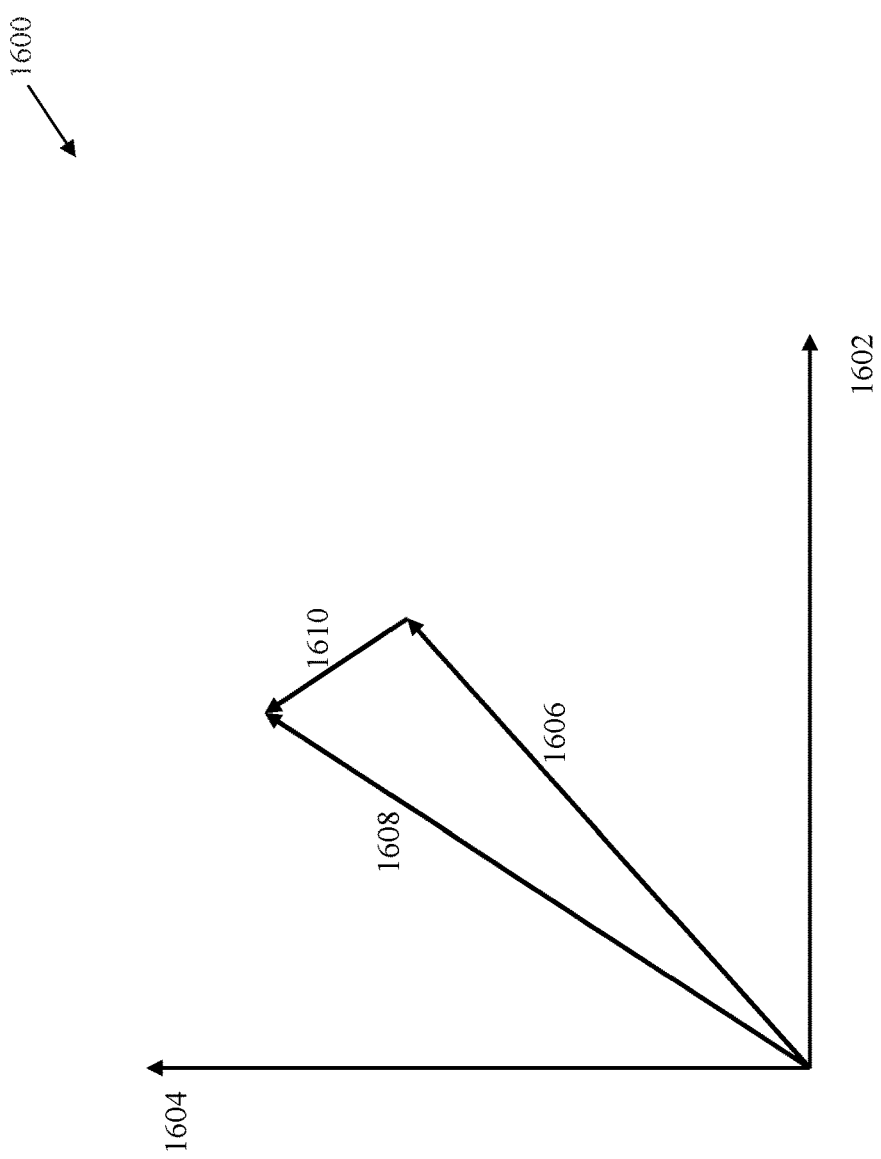
FIG. 16 illustrates reduced signal degradation according to embodiments of the invention.

In various embodiments, the data sample decompressor 1502 is implemented in an integrated circuit device, which may include an integrated circuit package containing the integrated circuit. In some embodiments, the data sample decompressor 1502 is implemented in a single integrated circuit die. In other embodiments, the data sample decompressor 1502 is implemented in more than one integrated circuit die of an integrated circuit device which may include a multi-chip package containing the integrated circuit FIG. 16 illustrates, generally at 1600, reduced signal degradation according to embodiments of the invention. Signal degradation is reduced using various embodiments of the invention. With reference to FIG. 16, an error vector plot is illustrated. The plot is used to illustrate degradation of communication signals represented by I and Q components, i.e., "in-phase" and "quadrature" components. The horizontal axis is used to plot the I component of the signal and the vertical axis is used to plot the Q component of the signal. The reference signal 1606 illustrates the signal before passing through the compression and decompression processes. A reconstructed signal 1608 is plotted in 1600. The difference between these two vectors is illustrated at 1610 and is referred to as the error vector. The normalized rms average power of the error vector is the EVM. Minimizing EVM is synonymous with minimizing signal degradation. For a given compression ratio, embodiments of the invention reduce the EVM relative to an EVM that would be achieved if the embodiments of the invention were not applied.

For example, the LTE class of communication signals signal will experience an average degradation of approximately 1% to 1.5% for a compression ratio of 3:1 if the data sample compressor architecture of FIG. 4 is used. If the data resampler 410 is removed and only blocks 412, 414, 416, and 418 are used to provide a 3:1 compression ratio a signal degradation of approximately 3% results. Thus, embodiments of the invention can be used to reduce the signal degradation coming from data sample compression. This is an advantage, because now there is extra signal degradation budget available for other aspects of the communication system or a higher compression ratio can be achieved at a 3% EVM, for example a 4:1 compression ratio can be implemented. For target compression ratios under 2:1, only blocks 412, 414, 416, and 418 are required to achieve an increased performance.

In the examples provided above, the BTS includes compression and decompression on both the forward link from the base station processor to the RF unit and the reverse link from the RF unit to the base station processor. Alternative embodiments include providing compression and decompression in one direction only. For the forward link, or down link, only the base station processor may include a compressor and only the RF unit includes a decompressor. For the reverse link, or up link, only the RF unit may include a compressor and only the base station processor includes a decompressor.

Implementation alternatives for the compressor and decompressor include programmable processors and application specific integrated circuits (ASIC). The programmable processors include software/firmware programmable processors such as computers, digital signal processors (DSP), microprocessors (including microcontrollers) and other programmable devices, and hardware programmable devices such as complex programmable logic devices (CPLD), field programmable gate arrays (FPGA). Depending on the type of programmable processor, the program implementing the compression and decompression operations are represented by software, firmware, netlist, bitstream or other type of processor executable instructions and data. Subsystems that implement the compressor and decompressor can be integrated into devices that perform other functions of the RF unit or base station processor. Implementations of compression or decompression can be performed in real time, that is, at least as fast as the sample rate of the ADC or DAC. Compression and decompression operations include multiplexing operations, inversion operations and simple arithmetic operations including addition, subtraction and shifting.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The methods herein may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

We claim:

1. A method to control compression of data for transmission over a serial data link, the method comprising:
    adjusting, at a parameter estimation processor, a target compression ratio by a first compression ratio to determine a remaining compression ratio, wherein the first compression ratio was performed by a resampling operation;
    estimating, at the parameter estimation processor, a set of compression parameters that are used to achieve the remaining compression ratio, the set of compression parameters includes N attenuation values, a filter order and a type of encoding; and
    sending the set of compression parameters to a data sample compressor, the data sample compressor applies the compression parameters to a packet of input data and outputs a plurality of compressed data words, and wherein an attenuator of the data sample compressor divides the packet of input data into N segments and applies an attenuation value from the set of N attenuation values to the data samples in one of the N segments.

2. The method of claim 1, wherein user programmable inputs are received, and further wherein the user programmable inputs include; input data packet length, compression ratio target and resampling factors.

3. The method of claim 1, wherein the sending changes the set of compression parameters for the packet-of input data.

4. The method of claim 3, wherein the packet of input data is a second packet of input data that is received after a first packet of input data, the method further comprising:
    receiving information on the plurality of compressed data words resulting from compression of the first packet of input data, the estimating uses achieved compression ratio information to estimate a set of compression parameters to be applied to the second packet of input data where the second packet of input data is compressed after the first packet of input data is compressed.

5. The method of claim 1, further comprising:
    supplying information on the compressed data words accumulating in an output buffer to the estimating, the estimating adjusts one or more of the attenuation values in the set of N attenuation values, when necessary, in order to achieve the target compression ratio for the compressed data words.

6. An integrated circuit configured to compress data for transmission over a serial data link, the integrated circuit comprising:
    a first parameter estimation processor coupled to a resampler and configured to receive input data information and user programmable inputs, the user programmable inputs set an input data packet length, a target compression ratio and a resampling factor, the first parameter estimation processor configured to adjust the target compression ratio by a first compression ratio to determine a remaining compression ratio when a resampling operation is enabled, estimate a set of compression parameters using the user programmable inputs and the input data information, the estimated set of compression parameters used to achieve the remaining compression ratio, the set of compression parameters including an attenuation value, a filter order and a type of encoding, the first parameter estimation processor further configured to send the set of compression parameters to a data sample compressor, wherein the first parameter estimation processor estimates compression parameters for a first channel of resampled input data samples, at a first clock frequency;
    a second parameter estimation processor configured to estimate compression parameters for a second channel of resampled input data samples, at the first clock frequency;
    a multiplexer coupled to the first parameter estimation processor and the second parameter estimation processor, the multiplexer multiplexes together the outputs from the first parameter estimation processor and the second parameter estimation processor and the resampled input data samples from the first channel and the second channel, the output of the multiplexer is compressed additionally to achieve the target compression ratio and the additional compression occurs at a clock frequency that is greater than the first clock frequency.

7. The parameter estimation processor of claim 6, wherein information resulting from compression of a first packet of input data is received at the first parameter estimation processor, the first parameter estimation processor uses achieved compression ratio information to estimate a set of compression parameters to be applied to a second packet of input data where the second packet of input data is compressed after the first packet of input data is compressed.

8. The integrated circuit device of claim 6 further comprising a first data resampler for resampling input data samples of a first channel of input data to generate the resampled input data samples in the first channel of resampled input data samples and a second data resampler for resampling input data samples of a second channel of input data to generate the resampled input data samples in the second channel of resampled input data samples.

9. The integrated circuit device of claim 6 further comprising a data sample compressor that is coupled to the output of the multiplexer, the data sample compressor operates at a clock frequency that is greater than the first clock frequency to additionally compress the output of the multiplexer to achieve the target compression ratio.

10. An integrated circuit device to compress data for transmission over a serial data link, comprising:

a data resampler for resampling input data samples to obtain resampled input data having a first compression ratio;

a parameter estimation processor is coupled to the data resampler and adjusts a target compression ratio by the first compression ratio to determine a remaining compression ratio, estimates a set of compression parameters to achieve the remaining compression ratio, the set of compression parameters including a set of N attenuation values, a filter order and a type of encoding;

a data attenuator is coupled to the data resampler and to the parameter estimation processor, the data attenuator receives one or more of the compression parameters in the set of compression parameters, divides a packet of input data into N segments and applies an attenuation value from the set of N attenuation values to the data samples in one of the N segments;

a redundancy remover coupled to the data attenuator and the parameter estimation processor, the redundancy remover receives one or more of the compression parameters and applies a filter corresponding to the filter order; and an encoder coupled to the redundancy remover and to the parameter estimation processor, the encoder receives one or more of the compression parameters and encodes the output of the redundancy remover using the type of encoding to generate a plurality of compressed data words.

\* \* \* \* \*